(12) United States Patent
Han et al.

(10) Patent No.: US 11,051,035 B2
(45) Date of Patent: Jun. 29, 2021

(54) PROCESSING OF ILLEGAL MOTION VECTORS FOR INTRA BLOCK COPY MODE IN VIDEO CODING

(71) Applicant: QUALCOMM Incorporated, San Diego, CA (US)

(72) Inventors: Yu Han, San Diego, CA (US); Wei-Jung Chien, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/742,790

(22) Filed: Jan. 14, 2020

(65) Prior Publication Data

US 2020/0260105 A1    Aug. 13, 2020

Related U.S. Application Data

(60) Provisional application No. 62/803,243, filed on Feb. 8, 2019.

(51) Int. Cl.
| | | |
|---|---|---|
| H04N 7/18 | (2006.01) | |
| H04N 19/52 | (2014.01) | |
| H04N 19/176 | (2014.01) | |
| H04N 19/159 | (2014.01) | |
| H04N 19/124 | (2014.01) | |

(52) U.S. Cl.
CPC .......... *H04N 19/52* (2014.11); *H04N 19/124* (2014.11); *H04N 19/159* (2014.11); *H04N 19/176* (2014.11)

(58) Field of Classification Search
CPC .... H04N 19/52; H04N 19/176; H04N 19/159; H04N 19/11; H04N 19/157; H04N 19/593
USPC ..................................................... 375/240.16
See application file for complete search history.

(56) References Cited

U.S. PATENT DOCUMENTS

| | | | | |
|---|---|---|---|---|
| 2005/0053293 A1* | 3/2005 | Lin | .......................... | H04N 19/16 382/236 |
| 2009/0196344 A1* | 8/2009 | Brown | ................... | H04N 19/59 375/240.02 |
| 2015/0195559 A1* | 7/2015 | Chen | ...................... | H04N 19/52 375/240.16 |
| 2015/0256857 A1* | 9/2015 | Joshi | ...................... | H04N 19/13 375/240.02 |
| 2015/0264348 A1* | 9/2015 | Zou | ....................... | H04N 19/593 375/240.02 |

OTHER PUBLICATIONS

Lainema et al, Intra Block Masking (Year: 2015).*

(Continued)

*Primary Examiner* — Shan E Elahi
(74) *Attorney, Agent, or Firm* — Shumaker & Sieffert, P.A.

(57) ABSTRACT

An example method for coding video data includes determining, for a current block of a current picture of video data, the current block coded using an intra block copy (IBC) mode, whether a motion vector (MV) for identifying a prediction block for the current block is a legal MV. The example method further includes, responsive to determining that the MV is not a legal MV, reconstructing samples of the current block using an alternative processing method.

22 Claims, 10 Drawing Sheets

(56) References Cited

OTHER PUBLICATIONS

Kwon et al, Fast Intra Block (IntraBC) search for HEVC screen content coding (Year: 2014).*
"Bilateral Filter", Wikipedia, Feb. 10, 2020, pp. 1-5.
Bross B., et al., "Versatile Video Coding (Draft 7)", Joint Video Experts Team (JVET) of ITU-T SG 16 WP 3 and ISO/IEC JTC 1/SC 29/WG 11, JVET-P2001-v9, 16th Meeting: Geneva, CH, Oct. 1-11, 2019, 490 pages.
Chen J., et al., "Algorithm Description of Joint Exploration Test Model 1," 1, JVET Meeting; Oct. 19, 2015-Oct. 21, 2015; Geneva;(The Joint Video Exploration Team of ISO/IEC JTC1/SC29/WG11 and ITU-T SG.16 ); URL: http://phenix.int-evry.fr/jvet/ ,, No. JVET-A1001 Feb. 24, 2016 (Feb. 24, 2016), XP030150000, 27 pages.
Chen J., et al., "Algorithm Description of Joint Exploration Test Model 7 (JEM7)", JVET-G1001-V1, Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7—p. 23, Paragraph 2.3.7.6, p. 17, Paragraph 2.3.5—p. 18, section 2.
Ergen S., "ZigBee/IEEE 802.15.4 Summary", Sep. 10, 2004, 37 Pages.
Han Y., et al., "CE8-related: Default Processing for IBC Mode", Joint Video Experts Team (JVET) of ITU-T SG 16 WP 3 and ISO/IEC JTC 1/SC 29/WG 11, JVET-N0316, 14th Meeting: Geneva, CH, Mar. 19-27, 2019, JVET-N0316-r1, pp. 1-4.
Han Y., et al., "CE8-1.4 and CE8-1.5: Default Processing for IBC Mode", Joint Video Experts Team (JVET) of ITU-T SG 16 WP 3 and ISO/IEC JTC 1/SC 29/WG 11, JVET-O0117, 15th Meeting: Gothenburg, SE, Jul. 3-12, 2019, pp. 1-7.
He K., et al., "Guided Image Filtering," IEEE Transactions on Pattern Analysis and Machine Intelligence, vol. 35, No. 6, Jun. 2013, 13 Pages.
IEEE Computer Society; "Part 11: Wireless LAN Medium Access Control (MAC) and Physical Layer (PHY) Specifications: Amendment 4: Enhancements for Very High Throughput for Operation in Bands below 6 GHz", IEEE Standard for Information technology— Telecommunications and information exchange between systems Local and metropolitan area networks—Specific requirements; Sponsored by LAN/MAN Standards Committee; IEEE Standard 802.11acTM-2013, Published on Dec. 18, 2013, 425 Pages.
ITU-T H.265, "Series H: Audiovisual and Multimedia Systems, Infrastructure of audiovisual services—Coding of moving video, High efficiency video coding," The International Telecommunication Union. Dec. 2016, 664 Pages.
Jang H., et al., "CE8-Related:The Corner Case Handling Regarding MV Derivation for Chroma IBC in Dual Tree Structure.", Joint Video Experts Team (JVET) of ITU-T SG 16 WP 3 and ISO/IEC JTC 1/SC 29/WG 11, JVET-N0466, 14th Meeting: Geneva, CH, Mar. 19-27, 2019, pp. 1-4.
Li J., et al., "Non-CE8: IBC Modifications", Joint Video Experts Team (JVET) of ITU-T SG 16 WP 3 and ISO/IEC JTC 1/SC 29/WG 11, JVET-N0201-v3, 14th Meeting: Geneva, CH, Mar. 19-27, 2019, pp. 1-12.
Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668, ISSN: 1051-8215, DOI: 10.1109/TCSVT.2012.2221191 the whole document.
"Sum of Absolute Transformed Differences", Wikipedia, Feb. 10, 2020, pp. 1-2.
Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.
Zhang (Bytedance) L., et al., "CE4-related: History-based Motion Vector Prediction", 11. JVET Meeting, Jul. 11, 2018-Jul. 18, 2018, Ljubljana, (The Joint Video Explorationteam of ISO/IEC JTC1/SC29/WG11 and ITU-TSG.16), No. JVET-K0104-v5, Jul. 18, 2018 (Jul. 18, 2018), XP030200019, 7 Pages, Retrieved from the Internet:URL:http://phenix.int-evry.fr/jvet/doc_end_user/documents/11_Ljubljana/wg11/JVET-K0104-v5.zip JVET-K0104 r4.docx [retrieved on Jul. 18, 2018] abstract sections 1-2.

* cited by examiner

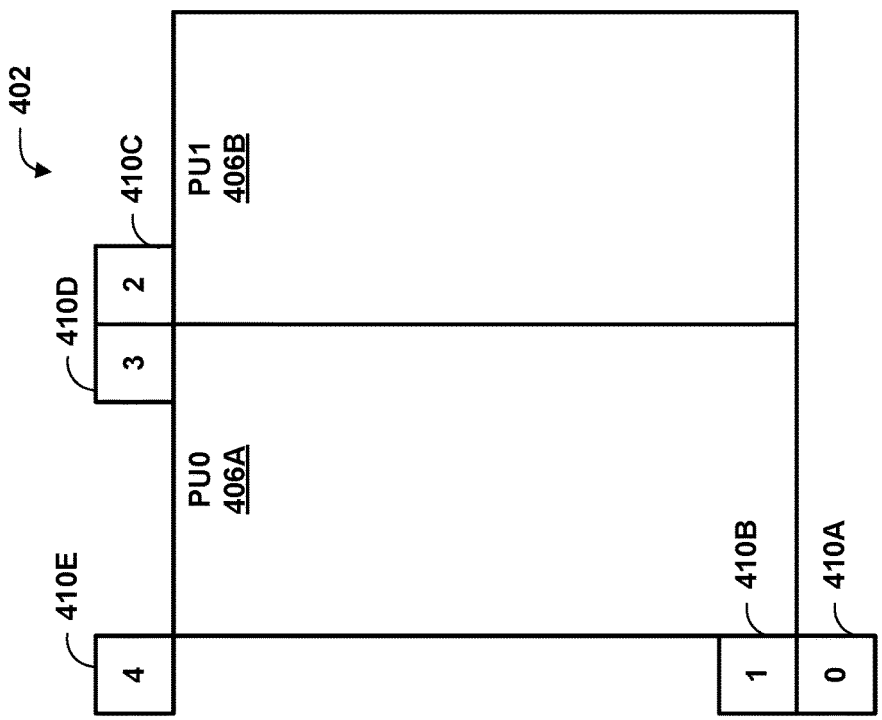
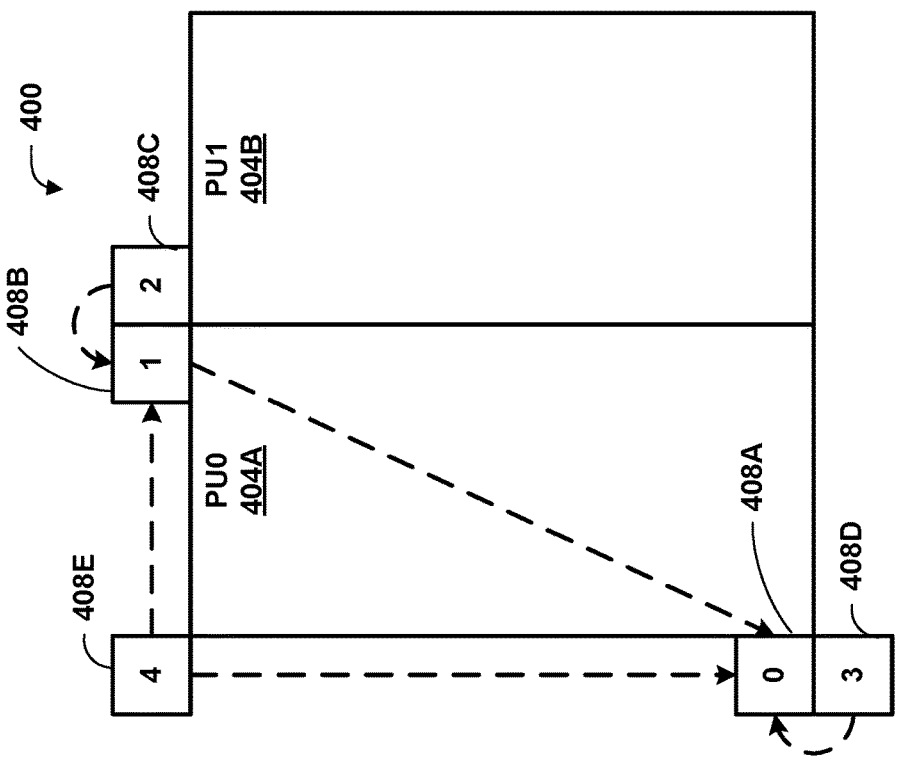

PROCESSING OF ILLEGAL MOTION VECTORS FOR INTRA BLOCK COPY MODE IN VIDEO CODING

This application claims the benefit of U.S. Provisional Application No. 62/803,243, filed Feb. 8, 2019, which is hereby incorporated by reference in its entirety.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for motion vector prediction when a block of video data is coded using an intra block copy (IBC) mode. IBC is a technique by which sample values are predicted from other samples in the same picture by means of a displacement vector, in a manner conceptually similar to motion-compensated prediction. When a video coder determines that the displacement vector of a block does not reference an area that can be used to predict sample values of the block, aspects of this disclosure enable the video coder to use one or more alternative processing methods for predicting the sample values of the block. The techniques of this disclosure may be applied to any of the existing video codecs, such as HEVC (High Efficiency Video Coding) or be an efficient coding tool in any future video coding standards (e.g., Versatile Video Coding (VVC)). JEM (Joint Exploration Model) techniques related to this disclosure are discussed, although it will be understood that the techniques of this disclosure are not limited to JEM and may also be applicable to other existing and/or future-arising standards, such as VVC.

In one example, a method for coding video data includes determining, for a current block of a current picture of video data, the current block coded using an intra block copy (IBC) mode, whether a motion vector (MV) for identifying a prediction block for the current block is a legal MV. The method further includes responsive to determining that the MV is not a legal MV, reconstructing samples of the current block using an alternative processing method.

In another example, a device for coding video data includes a memory configured to store the video data. The device further includes one or more processors implemented in circuitry and configured to: determine, for a current block of a current picture of the video data, the current block coded using an intra block copy (IBC) mode, whether a motion vector (MV) for identifying a prediction block for the current block is a legal MV; and responsive to determining that the MV is not a legal MV, reconstruct samples of the current block using an alternative processing method.

In another example, a video coder includes means for determining, for a current block of a current picture of video data, the current block coded using an intra block copy (IBC) mode, whether a motion vector (MV) for identifying a prediction block for the current block is a legal MV. The video coder further includes means for responsive to determining that the MV is not a legal MV, reconstructing samples of the current block using an alternative processing method.

In another example, a computer-readable storage medium is encoded with instructions that, when executed, cause one or more processors to: determine, for a current block of a current picture of video data, the current block coded using an intra block copy (IBC) mode, whether a motion vector (MV) for identifying a prediction block for the current block is a legal MV; and responsive to determining that the MV is not a legal MV, reconstruct samples of the current block using an alternative processing method.

The details of one or more examples are set forth in the accompanying drawings and the description below. Other features, objects, and advantages will be apparent from the description, drawings, and claims.

BRIEF DESCRIPTION OF DRAWINGS

FIGS. 3A and 3B are conceptual diagrams illustrating spatial neighboring candidates in HEVC.

DETAILED DESCRIPTION

The techniques of this disclosure are related to the intra block copy (IBC) mode and shared motion vector predictor list design. The techniques may be applied to any of the existing video codecs, such as HEVC (High Efficiency Video Coding), VVC (Versatile Video Coding) or be an efficient coding tool in any future video coding standards. In this section, HEVC and JEM techniques and on-going works in Versatile Video Coding (VVC) related to this invention are firstly reviewed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions, High Efficiency Video Coding (HEVC) or ITU-T H.265, including its range extension, multiview extension (MV-HEVC) and scalable extension (SHVC).

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. And the latest version of reference software, i.e., Joint Exploration Model 7 (JEM 7) is available at jvet.hhi.fraunhofer.de/svn/svn_HMJEMSoftware/tags/HM-16.6-JEM-7.0/. An Algorithm description of Joint Exploration Test Model 7 (JEM7), hereinafter "JVET-G1001, is available at phenix.it-sudparis.eu/jvet/doc_end_user/current_document.php?id=3286.

Figure 1:
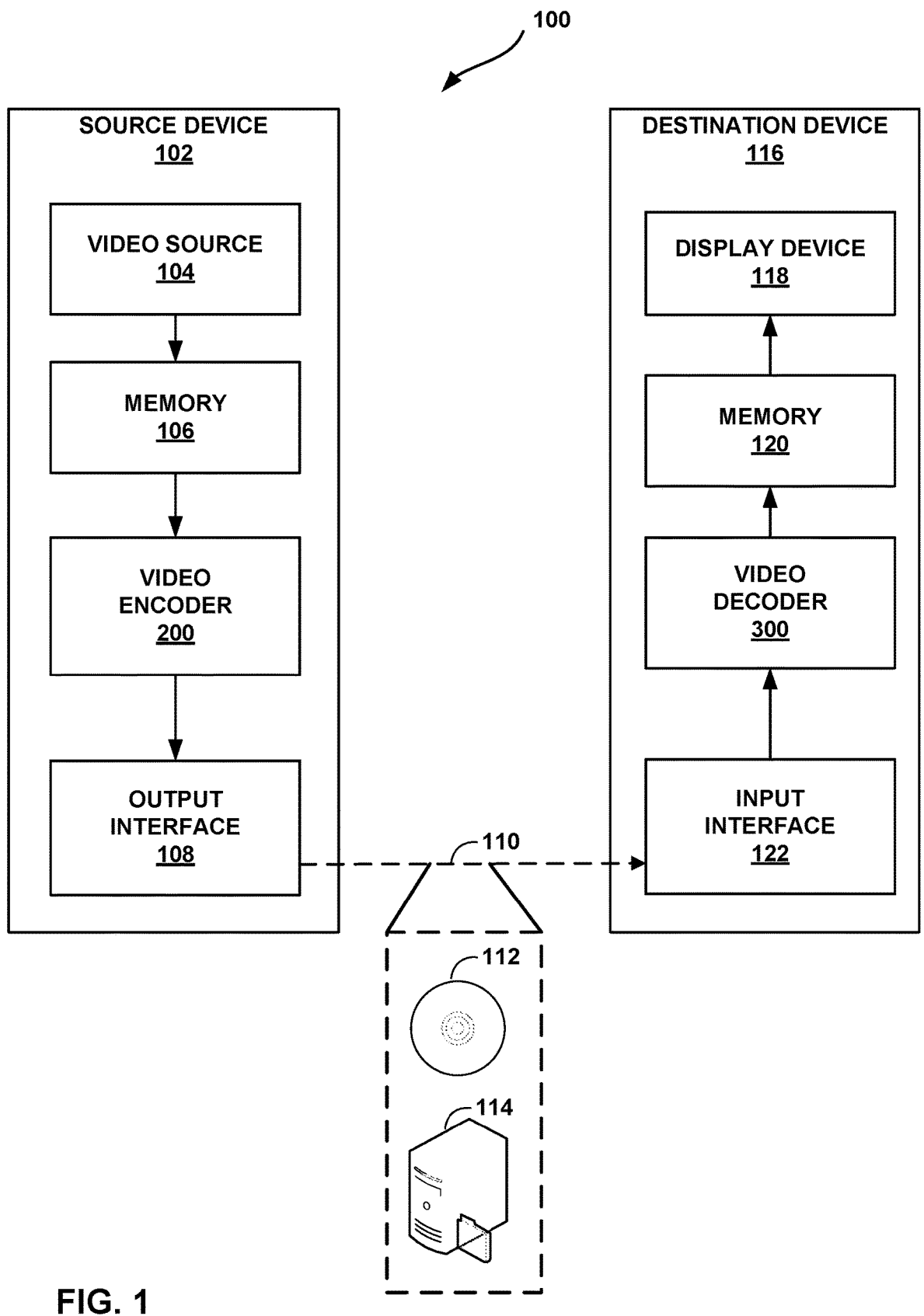
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for processing of illegal vectors for intra block coding mode. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for processing illegal of illegal vectors for intra block coding mode. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 7)," Joint Video Experts Team (WET) of ITU-T SG 16 WP 3 and ISO/IEC JTC 1/SC 29/WG 11, 16$^{th}$ Meeting: Geneva, CH, 1-11 Oct. 2019, JVET-P2001-v9 (hereinafter "VVC Draft 7"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction, intra-prediction, or intra block copy. Inter-prediction generally refers to predicting the CU from data of a previously coded picture, whereas intra-prediction and intra copy prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

As mentioned above, a video coder (e.g., video encoder 200 or video decoder 300) may apply inter prediction to generate a prediction block for a video block of a current picture. For instance, the video coder may apply inter prediction to generate a prediction block for a prediction block of a CU. If the video coder applies inter prediction to generate a prediction block, the video coder generates the prediction block based on decoded samples of one or more reference pictures. Typically, the reference pictures are pictures other than the current picture. In some video coding specifications, a video coder may also treat the current picture itself as a reference picture. The video coder may determine one or more reference picture lists. Each of the reference picture lists includes zero or more reference pictures. One of the reference picture lists may be referred to as Reference Picture List 0 (RefPicList0) and another reference picture list may be referred to as Reference Picture list 1 (RefPicList1).

The video coder may apply uni-directional inter prediction or bi-directional inter prediction to generate a prediction block. When the video coder applies uni-directional inter prediction to generate a prediction block for a video block, the video coder determines a single reference block for the video block based on a samples of a single reference picture. The reference block may be a block of samples that is similar to the prediction block. Furthermore, when the video coder applies uni-directional inter prediction, the video coder may set the prediction block equal to the reference block. When the video coder applies bi-directional inter prediction to generate a prediction block for a video block, the video coder determines two reference blocks for the video block. In some examples, the two reference blocks are in reference pictures in different reference picture lists. Additionally, when the video coder applies bi-direction inter-prediction, the video coder may determine the prediction block based on the two reference blocks. For instance, the video coder may determine the prediction block such that each sample of the prediction block is a weighted average of corresponding samples of the two reference blocks. Reference list indicators may be used to indicate which of the reference picture lists include reference pictures used for determining reference blocks.

As mentioned above, a video coder may determine a reference block based on samples of a reference picture. In some examples, the video coder may determine the reference block such that each sample of the reference block is equal to a sample of the reference picture. In some examples, as part of determining a reference block, the video coder may interpolate samples of the reference block from samples of the reference picture. For example, the video coder may determine that a sample of the prediction block is a weighted average of two or more samples of the reference picture.

In some examples, when video encoder 200 performs uni-directional inter prediction for a current block of a current picture, video encoder 200 identifies a reference block within one or more reference pictures in one of the reference picture lists. For instance, video encoder 200 may search for a reference block within the one or more reference pictures in the reference picture list. In some examples, video encoder 200 uses a mean squared error or other metric to determine the similarity between the reference block and the current block. Furthermore, video encoder 200 may determine motion parameters for the current block. The motion parameters for the current block may include a motion vector and a reference index. The motion vector may indicate a spatial displacement between a position of the current block within the current picture and a position of the reference block within the reference picture. The reference index indicates a position within the reference picture list of the reference frame that contains the reference picture list. The prediction block for the current block may be equal to the reference block.

When video encoder 200 performs bi-directional inter prediction for a current block of a current picture, video encoder 200 may identify a first reference block within reference pictures in a first reference picture list ("list 0") and may identify a second reference block within reference pictures in a second reference picture list ("list 1"). For instance, video encoder 200 may search for the first and second reference blocks within the reference pictures in the first and second reference picture lists, respectively. Video encoder 200 may generate, based at least in part on the first and the second reference blocks, the prediction block for the current block. In addition, video encoder 200 may generate a first motion vector that indicates a spatial displacement between the current block and the first reference block. Video encoder 200 may also generate a first reference index that identifies a location within the first reference picture list of the reference picture that contains the first reference block. Furthermore, video encoder 200 may generate a second motion vector that indicates a spatial displacement between the current block and the second reference block. Video encoder 200 may also generate a second reference index that identifies a location within the second reference picture list of the reference picture that includes the second reference block.

When video encoder 200 performs uni-directional inter prediction on a current block, video decoder 300 may use the motion parameters of the current block to identify the reference block of the current block. Video decoder 300 may then generate the prediction block of the current block based on the reference block. When video encoder 200 performs bi-directional inter prediction to determine a prediction block for a current block, video decoder 300 may use the motion parameters of the current block to determine two reference blocks. Video decoder 300 may generate the prediction block of the current block based on the two reference samples of the current block.

Video encoder 200 may signal motion parameters of a block in various ways. Such motion parameters may include motion vectors, reference indexes, reference picture list indicators, and/or other data related to motion. In some examples, video encoder 200 and video decoder 300 may use motion prediction to reduce the amount of data used for signaling motion parameters. Motion prediction may comprise the determination of motion parameters of a block (e.g., a PU, a CU, etc.) based on motion parameters of one or more other blocks. There are various types of motion prediction. For instance, merge mode and advanced motion vector prediction (AMVP) mode are two types of motion prediction.

In merge mode, video encoder 200 generates a candidate list. The candidate list includes a set of candidates that indicate the motion parameters of one or more source blocks. The source blocks may spatially or temporally neighbor a current block. Furthermore, in merge mode, video encoder 200 may select a candidate from the candidate list and may use the motion parameters indicated by the selected candidate as the motion parameters of the current block. Video encoder 200 may signal the position in the candidate list of the selected candidate. Video decoder 300 may determine, based on information obtained from a bitstream, the index into the candidate list. In addition, video decoder 300 may generate the same candidate list and may determine, based on the index, the selected candidate. Video decoder 300 may then use the motion parameters of the selected candidate to generate a prediction block for the current block.

Skip mode is similar to merge mode. In skip mode, video encoder 200 and video decoder 300 generate and use a candidate list in the same way that video encoder 200 and video decoder 300 use the candidate list in merge mode. However, when video encoder 200 signals the motion parameters of a current block using skip mode, video encoder 200 does not signal any residual data for the current block. Accordingly, video decoder 300 may determine a prediction block for the current block based on one or more reference blocks indicated by the motion parameters of a selected candidate in the candidate list. Video decoder 30 may then reconstruct samples in a coding block of the current block such that the reconstructed samples are equal to corresponding samples in the prediction block of the current block.

AMVP mode is similar to merge mode in that video encoder 200 may generate a candidate list for a current block and may select a candidate from the candidate list. However, for each respective reference block used in determining a prediction block for the current block, video encoder 200 may signal a respective motion vector difference (MVD) for the current block, a respective reference index for the current block, and a respective candidate index indicating a selected candidate in the candidate list. An MVD for a block may indicate a difference between a motion vector of the block and a motion vector of the selected candidate. The reference index for the current block indicates a reference picture from which a reference block is determined.

Furthermore, when AMVP mode is used, for each respective reference block used in determining a prediction block for the current block, video decoder 300 may determine a MVD for the current block, a reference index for the current block, and a candidate index and a motion vector prediction (MVP) flag. Video decoder 300 may generate the same candidate list and may determine, based on the candidate index, a selected candidate in the candidate list. As before, this candidate list may include motion vectors of neighboring blocks that are associated with the same reference index as well as a temporal motion vector predictor which is derived based on the motion parameters of the neighboring block of the co-located block in a temporal reference picture. Video decoder 300 may recover a motion vector of the current block by adding the MVD to the motion vector indicated by the selected AMVP candidate. That is, video decoder 300 may determine, based on a motion vector indicated by the selected AMVP candidate and the MVD, the motion vector of the current block. Video decoder 300 may then use the recovered motion vector or motion vectors of the current block to generate prediction blocks for the current block.

When a video coder (e.g., video encoder 200 or video decoder 300) generates an AMVP candidate list for a current block, the video coder may derive one or more AMVP candidates based on the motion parameters of reference blocks (e.g., spatially-neighboring blocks) that contain locations that spatially neighbor the current PU and one or more AMVP candidates based on motion parameters of PUs that temporally neighbor the current PU. The candidate list may include motion vectors of reference blocks that are associated with the same reference index as well as a temporal motion vector predictor which is derived based on the motion parameters (i.e., motion parameters) of the neighboring block of the co-located block in a temporal reference picture. A candidate in a merge candidate list or an AMVP candidate list that is based on the motion parameters of a reference block that temporally neighbors a current block. This disclosure may use the term "temporal motion vector predictor" to refer to a block that is in a different time instance than the current block and is used for motion vector prediction.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Intra block copy generally refers to predicting the CU from data from a previously coded area of the current picture of the CU. To perform intra block copy, video encoder 200 may generate the prediction block using one or more motion vectors. Video encoder 200 may generally perform a motion search to identify a reference block in the current picture that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU.

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction, inter-prediction, or intra block copy of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, a video coder such as video encoder 200 and/or video decoder may determine, for a current block of a current picture of video data, the current block coded using an intra block copy (IBC) mode, whether a motion vector (MV) for identifying a prediction block for the current block is a legal MV. The video coder may, responsive to determining that the MV is not a legal MV, reconstruct samples of the current block using an alternative processing method.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
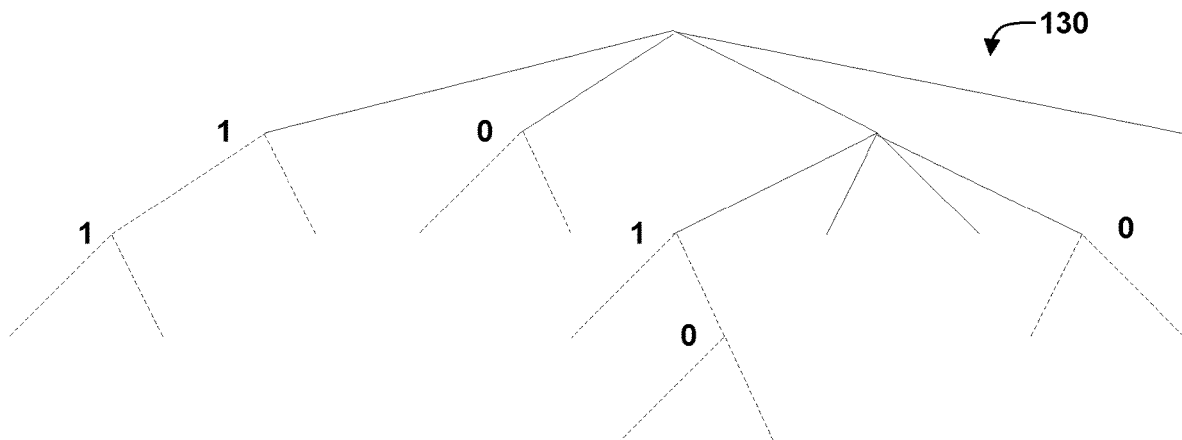
FIGS. 2A and 2B are conceptual diagrams illustrating an example quadtree binary tree (QTBT) structure, and a corresponding coding tree unit (CTU).
Figure 2B:
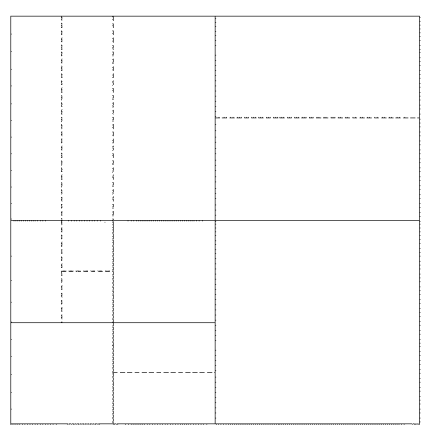

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, the leaf quadtree node will not be further split by the binary tree, because the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Aspects of the coding unit (CU) structure and motion vector prediction in HEVC are described in the following paragraphs. In HEVC, the largest coding unit in a slice is called a coding tree block (CTB) or coding tree unit (CTU). In HEVC, a CTB contains a quad-tree the nodes of which are CUs. The size of a CTB may range from 16×16 to 64×64 in the HEVC main profile (although technically 8×8 CTB sizes can be supported). The size of a CU may range from being the same size of a CTB to being as small as 8×8. Each CU is coded with one mode, such as inter prediction or intra prediction. When a CU is inter coded, the CU may be further partitioned into 2 or 4 prediction units (PUs) or become just one PU when further partition does not apply. When two PUs are present in one CU, they can be half size rectangles or two rectangle size with quarter (¼) or three-quarter (¾) size of the CU. When the CU is inter coded, one set of motion information is present for each PU. In addition, each PU is coded with a unique inter prediction mode to derive the set of motion information.

Aspects of motion vector prediction in HEVC are discussed in the following paragraphs. In the HEVC standard, there are two inter prediction modes, named merge (skip is considered as a special case of merge) and advanced motion vector prediction (AMVP) modes respectively for a PU. In either AMVP or merge mode, a motion vector (MV) candidate list is maintained for multiple motion vector predictors. The motion vector(s), as well as reference indices in the merge mode, of the current PU are generated by taking one candidate from the MV candidate list. In the case of merge mode, the MV candidate list may be referred to as a "merge candidate list" and candidates in a merge candidate list may be referred to as "merge candidates." Similarly, in the case of AMVP mode, the MV candidate list may be referred to as an "AMVP candidate list" and candidates in an AMVP candidate list may be referred to as "AMVP candidates." In some instances, this disclosure may simply refer to an MV candidate list (e.g., a merge candidate list or an AMVP candidate list) as a "candidate list." Furthermore, this disclosure may use the term "MV candidate" to refer to either a merge candidate or an AMVP candidate In HEVC and certain other video coding standards, the MV candidate list may contain up to five (5) candidates for the merge mode and only two (2) candidates for the AMVP mode. A merge candidate may contain a set of motion information, e.g., motion vectors corresponding to both reference picture lists (list 0 and list 1) and the reference indices. In some examples, reference picture lists may also be referred to as "reference lists." If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information while an AMVP candidate contains just one motion vector for a specific prediction direction and reference index. The candidates for both modes are derived similarly from the same spatial and temporal neighboring blocks.

FIGS. 3A and 3B are conceptual diagrams illustrating spatial neighboring candidates in HEVC. Spatial MV candidates are derived from the neighboring blocks shown on FIGS. 3A and 3B, for a specific PU (PU0), although the methods of generating the candidates from the blocks differ for merge and AMVP modes.

In merge mode, up to four spatial MV candidates can be derived with the orders shown in FIG. 3A with numbers, and the order is the following: left (0, A1), above (1, B1), above-right (2, B0), below-left (3, A0), and above left (4, B2), as shown in FIG. 3A. That is, in FIG. 3A, block 400 includes PU0 404A and PU1 404B. When a video coder is to code motion information for PU0 404A using merge mode, the video coder adds motion information from spatial neighboring blocks 408A, 408B, 408C, 408D, and 408E to a candidate list, in that order. Spatial neighboring blocks 408A, 408B, 408C, 408D, and 408E may also be referred to as, respectively, blocks A1, B1, B0, A0, and B2, as in HEVC.

In AMVP mode, the spatial neighboring blocks are divided into two groups: a left group including blocks 0 and 1, and an above group including blocks 2, 3, and 4 as shown on FIG. 3B. These spatial neighboring blocks are labeled, respectively, as blocks 410A, 410B, 410C, 410D, and 410E in FIG. 3B. In particular, in FIG. 3B, block 402 includes PU0 406A and PU1 406B, and blocks 410A, 410B, 410C, 410D, and 410E represent spatial neighbors to PU0 406A. For each group, the potential candidate in a neighboring block referring to the same reference picture as that indicated by the signaled reference index has the highest priority to be chosen to form a final candidate of the group. It is possible that all spatial neighboring blocks do not contain a motion vector pointing to the same reference picture. Therefore, if such a candidate cannot be found, the video coder may scale the first available candidate to form the final candidate; thus, the temporal distance differences can be compensated.

Figure 4A:
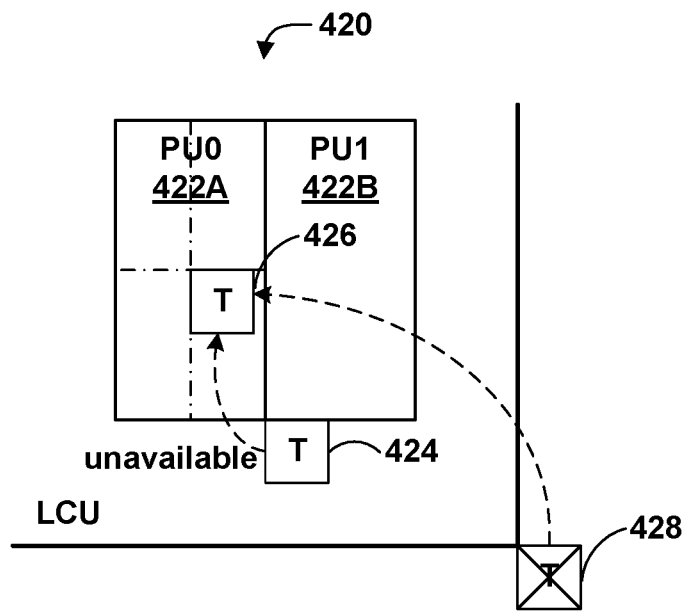
FIGS. 4A and 4B are conceptual diagrams illustrating example temporal motion vector predictor (TMVP) candidates and motion vector (MV) scaling.
Figure 4B:
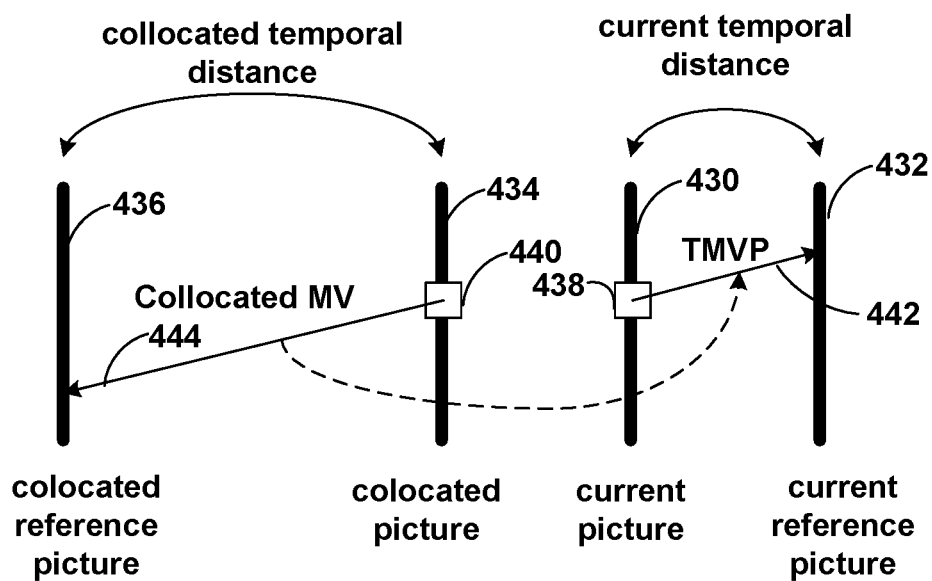

FIGS. 4A and 4B are conceptual diagrams illustrating temporal motion vector prediction (TMVP) candidates in HEVC. In particular, FIG. 4A illustrates an example CU 420 including PU0 422A and PU 1 422B. PU0 422A includes a center block 426 for PU 422A and a bottom-right block 424 to PU0 422A. FIG. 4A also shows an external block 428 for which motion information may be predicted from motion information of PU0 422A, as discussed below. FIG. 4B illustrates a current picture 430 including a current block 438 for which motion information is to be predicted. In particular, FIG. 4B illustrates a co-located picture 434 to current picture 430 (including co-located block 440 to current block 438), a current reference picture 432, and a co-located reference picture 436. Co-located block 440 is predicted using motion vector 444, which is used as a temporal motion vector predictor (TMVP) candidate 442 for motion information of current block 438.

A video coder, such as video encoder 200 or video decoder 300, may add a TMVP candidate, such as TMVP candidate 442, into the MV candidate list after any spatial motion vector candidates if TMVP is enabled and the TMVP candidate is available. The process of motion vector derivation for TMVP candidate is the same for both merge and AMVP modes; however, the target reference index for the TMVP candidate in the merge mode is set to 0, according to HEVC.

The primary block location for TMVP candidate derivation is the bottom right block outside of the co-located PU, as shown in FIG. 4A as bottom right block 424 to PU0 422A, to compensate the bias to the above and left blocks used to generate spatial neighboring candidates. However, if bottom right block 424 is located outside of the current CTB row or motion information is not available for bottom right block 424, the block is substituted with center block 426 of the PU as shown in FIG. 4A.

As shown in FIG. 4B, motion vector for TMVP candidate 442 is derived from co-located block 440 of the co-located picture 434, as indicated in the slice level information. The motion vector for the co-located PU is referred to as a "co-located MV" or a "co-located MV." Similar to temporal direct mode in AVC, in order to derive a motion vector of the TMVP candidate, the co-located MV may have to be scaled to compensate for the temporal distance differences, as shown in FIG. 4B.

Similar to temporal direct mode in AVC, a motion vector of the TMVP candidate may be subject to motion vector scaling, which is performed to compensate picture order count (POC) distance differences, as shown in FIGS. 2A and 2B. For instance, a motion vector of the TMVP candidate may be scaled to compensate POC distance differences between current picture 430 and current reference picture 432, and co-located picture 434 and co-located reference picture 436. That is, motion vector 444 may be scaled to produce TMVP candidate 442, based on these POC differences.

Other aspects of motion prediction in HEVC are described in the following paragraphs. Several aspects of merge and AMVP modes are described as follows. One such aspect is motion vector scaling that may be performed by a video coder, such as video encoder 200 and video decoder 300. It is assumed that the value of motion vectors is proportional to the distance of pictures in the presentation time. A motion vector associates two pictures, the reference picture, and the picture containing the motion vector (namely the "containing" picture). When a motion vector is utilized to predict the other motion vector, the distance of the containing picture and the reference picture is calculated based on the Picture Order Count (POC) values.

For a motion vector to be predicted, both the motion vector's associated containing picture and reference picture may be different. Therefore a new distance (based on POC) may be calculated. Video encoder 200 and video decoder 300 may scale the motion vector based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

In another example, video encoder 200 and video decoder 300 may perform artificial motion vector candidate generation. If a motion vector candidate list is not complete, artificial motion vector candidates are generated and inserted at the end of the MV candidate list until the MV candidate list has all MV candidates. In merge mode, there are two types of artificial MV candidates: combined candidates derived only for B-slices (bi-predictively coded slices) and zero candidates used if the first type does not provide enough artificial candidates. In a B-slice, video blocks may be coded using intra prediction, uni-directional inter prediction, bi-directional inter prediction, and/or other coding modes. A zero candidate is a candidate that specifies motion vectors with 0 magnitude. For each pair of candidates that is already in the candidate list and has the necessary motion information, video encoder 200 and video decoder 300 may derive bi-directional combined motion vector candidates by a combination of the motion vector of the first candidate referring to a picture in the list 0 and the motion vector of a second candidate referring to a picture in the list 1.

In another example, video encoder 200 and video decoder 300 may perform a pruning process for candidate insertion. Candidates from different blocks may happen to be the same, which decreases the efficiency of a merge mode candidate list or AMVP mode candidate list. Accordingly, video encoder and video decoder 300 may apply a pruning process to address this problem. The pruning process compares one candidate against the other candidates in a current candidate list to avoid inserting an identical candidate, to a certain extent. To reduce the complexity, video encoder 200 and video decoder 300 may apply the pruning process to a limited number of candidates instead of comparing each potential candidate with all the other existing candidates.

In yet another example, video encoder 200 and video decoder 300 may perform an enhanced motion vector prediction process, such as those described below. In the development of Versatile Video Coding (VVC), there are several inter coding tools which derive or refine the candidate list of motion vector prediction or merge prediction for the current block. Several of these approaches are described below. These approaches include history-based motion vector prediction, pairwise average candidates, and merge list in VTM3.0.

History-based motion vector prediction (HMVP) (e.g., as described in JVET-K0104, available at phenix.it-sudparis.eu/jvet/doc_end_user/documents/11_Ljubljana/wg11/JVET-K0104-v5.zip) is a history-based method in which a video coder, such as video encoder 200 and video decoder 300, may determine a MV predictor for each block from a list of previously-decoded MVs in addition to MVs in immediately adjacent causal neighboring motion fields. The immediately adjacent causal neighboring motion fields are motion fields of locations that are immediately adjacent to a current block and occur prior to the current block in decoding order. In HMVP, a table is maintained for previously decoded motion vectors as HMVP candidates.

Video encoder 200 and video decoder 300 may maintain a table with multiple HMVP candidates during the encoding/decoding process. To maintain the table, video encoder 200 and video decoder 300 may add HMVP candidates to the table as well as remove HMVP candidates from the table. Video encoder 200 and video decoder 300 may be configured to empty the table (e.g., remove all of the HMVP candidates) when a new slice is encountered. Video encoder 200 and video decoder 300 may be configured such that, whenever there is an inter-coded block, video encoder 200 and video decoder 300 may insert the associated motion information into the table in a first-in-first-out (FIFO) fashion as a new HMVP candidate. Then, video encoder 200 and video decoder 300 may be configured to apply a constraint FIFO rule. When inserting a HMVP candidate to the table, video encoder 200 and video decoder 300 may first apply a redundancy check (e.g., pruning) to determine whether there is an identical HMVP candidate in the table. If found, video encoder 200 and video decoder 300 may remove that particular HMVP candidate from the table and may move all the HMVP candidates after that candidate. For example, if the removed HMVP candidate was in the first slot in the FIFO, when the removed HMVP candidate was removed, video encoder 200 and video decoder 300 move each of the other HMVP candidates forward one position in the table.

Video encoder 200 and video decoder 300 may be configured to use HMVP candidates in the merge candidate list construction process. For example, video encoder 200 and video decoder 300 may be configured to insert all HMVP candidates from the last entry to the first entry in the table after the TMVP candidate. Video encoder 200 and video decoder 300 may be configured to apply pruning on the HMVP candidates. In some examples, once the total number of available merge candidates reaches the signaled or predetermined maximum number of allowed merge candidates, video encoder 200 and video decoder 300 may terminate the merge candidate list construction process.

Similarly, video encoder 200 and video decoder 300 may be configured to also use HMVP candidates in the AMVP candidate list construction process. Video encoder 200 and video decoder 300 may be configured to insert the motion vectors of the last K HMVP candidates in the table after the TMVP candidate. Video encoder 200 and video decoder 300 may be configured to use only HMVP candidates with the same reference picture as an AMVP target reference picture (i.e., a reference picture in an AMVP reference picture list selected for use with the current block) d to construct the AMVP candidate list. Video encoder 200 and video decoder 300 may be configured to apply pruning on the HMVP candidates.

Pairwise average candidates is another enhancement to motion vector prediction. Pairwise average candidates are used in VTM3.0. Pairwise average candidates are generated by averaging predefined pairs of candidates in the current merge candidate list (includes spatial candidates, TMVP, and HMVP), and the predefined pairs are defined as $\{(0, 1), (0, 2), (1, 2), (0, 3), (1, 3), (2, 3)\}$, where the numbers denote the merge indices to the merge candidate list. Video encoder 200 and/or video decoder 300 may calculate the averaged motion vectors are calculated separately for each reference list (i.e., reference picture list), such as in the example of bi-prediction. For example, video encoder 200 and/or video decoder 300 may take a merge candidate in the current merge candidate list at merge index 0 and average that merge candidate with the merge candidate in the current merge candidate list at merge index 1. Video encoder 200 and/or video decoder 300 may average the other defined pairs noted above. If both motion vectors are available in one reference list, video encoder 200 and/or video decoder 300 may average these two motion vectors even when they point to different reference pictures. If only one motion vector is available in the reference list, video encoder 200 and/or video decoder 300 may use the one available motion vector directly, in other words, without averaging the available motion vector with another motion vector. If no motion vector is available, video encoder 200 and/or video decoder 300 may keep this list illegal. The pairwise average candidates may replace the combined candidates of the HEVC standard.

In VTM4.0, for normal inter merge mode, the size of the merge candidate list is six (6) and the order of the merge candidate list may be as follows:
  1. Spatial candidates for blocks A1, B1, B0 and A0.
  2. If number of candidates less than four (4), add the spatial candidate for block B2 to the list.
  3. TMVP candidate.
  4. HMVP candidates (cannot be the last candidate in the list).

5. Pairwise candidates.
6. Zero motion vector candidates.

In VTM4.0, for intra block copy (IBC) mode, the size of the merge candidate list is six (6) and the order of the merge candidate list may be as follows:

1. Spatial candidates for blocks A1, B1, B0 and A0.
2. If the number of candidates is fewer than four (4), add the spatial candidate for block B2.
3. HMVP candidates (cannot be the last candidate in the list).
4. Pairwise candidates.

For IBC mode, if the candidates are legal, the video coder may add the candidates into the merge/skip list. Legal candidate are candidates coded in IBC mode and satisfy the following conditions: the spatial motion vector predictor candidate for block B1 is pruned by the spatial motion vector predictor candidate for block A1 by comparing the spatial motion vector predictor candidate of block B1 with the spatial motion vector predictor candidate of block A1. If the spatial motion vector predictor candidate for block B1 is different from the spatial motion vector predictor candidate for block A1, the spatial motion vector predictor candidate for block B1 is added to the merge/skip list along with the spatial motion vector predictor candidate for block A1. In a similar fashion, the spatial motion vector predictor candidate for block B0 is pruned by the spatial motion vector predictor candidate for block B1, and the spatial motion vector predictor candidate for block A0 is pruned by the spatial motion vector predictor candidate for block A1. If the number of candidates resulting from the pruning process is fewer than four (4), the spatial motion vector predictor candidate for block B2 is added to the merge/skip list, subject to pruning by the spatial motion vector predictor candidates for blocks A1 and B1; The first two HMVP candidates are similarly pruned by the spatial motion vector predictor candidates for blocks A1 and B1; No pruning is performed on pairwise candidates.

In the most recent draft, for IBC mode, pairwise candidates have been removed from the merge candidate list. In addition, spatial candidates for blocks A0 and B0 have also been removed from the merge candidate list. The size of the merge candidate list has also been modified to five (5). Thus, the order of the merge candidate list may be as follows:

1. Spatial candidates for blocks A1, B1.
2. HMVP candidates (cannot be the last candidate in the list).

If the number of candidates is fewer than five (5), zero motion vectors (motion vectors having a value of zero) are added to the end of the merge candidate list. The spatial motion vector predictor candidate for B2 and the first two HMVP candidates may each be subject to pruning by the spatial motion vector candidates for blocks A1 and B1, similar to the previously-described pruning process.

Various examples of screen content coding (SCC) tools are described below, in particular intra block copy (IBC). While the coding tools described below (e.g., intra block copy (IBC), independent IBC mode, and shared merging candidates list) may be used in the context of SCC, video encoder 200 and/or video decoder 300 may, in some examples, also use these coding tools outside the context of SCC. Intra block copy (IBC) is sometimes referred to as current picture referencing (CPR). In IBC, a motion vector refers to already-reconstructed reference samples in the current picture. In some examples, such a motion vector is also referred to as a block vector. IBC was supported in HEVC screen content coding extension (HEVC SCC). Video encoder 200 may signal an IBC-coded CU as an inter coded block. Currently, in HEVC, the luma motion (or block) vector of an IBC-coded CU must be in integer precision. For instance, video encoder 200 and/or video decoder 300 may clip luma motion vectors to integer precision. In some examples, video encoder 200 and/or video decoder 300 may also clip chroma motion vectors to integer precision. In other video coding standards, a luma motion vector and/or a chroma motion vector of an IBC-coded CU may use sub-pel precision.

When combined with AMVR, the IBC mode can switch between 1-pel and 4-pel motion vector precisions. Video encoder 200 and video decoder 300 may place the current picture at the end of reference picture list L0. To reduce memory consumption and decoder complexity, the version of IBC in VTM-3.0 allows video decoder 300 to use only the reconstructed portion of the current CTU. The restriction of allowing video decoder 300 to use only the reconstructed portion of the current CTU may allow for video decoder 300 to implement the IBC mode using local on-chip memory for hardware implementations. While this disclosure describes the reconstruction-based aspects of IBC as being performed by video decoder 300, it will be appreciated that video encoder 200 may also implement these aspects of IBC using a decoding loop or reconstruction loop.

At the encoder side, video encoder 200 may perform hash-based motion estimation for IBC. Video encoder 200 may perform a rate distortion (RD) check for blocks with either width or height no larger than sixteen (16) luma samples. For a non-merge mode, video encoder 200 may perform the block vector search using a hash-based search first. For example, video encoder 200 may apply a hash transform to blocks of video data. Video encoder 200 then may search for blocks with the same or similar hash values as the current block. If hash search does not return a valid candidate, video encoder 200 may perform a block matching based local search.

Another example of an SCC tool is independent IBC mode. In VTM4.0, video encoder 200 may signal IBC mode with a block-level flag and can signal an IBC mode as IBC AMVP mode or IBC skip/merge mode. The version of IBC mode applied in VTM4.0 may be referred to as independent IBC mode. According to VTM4.0, IBC mode is treated as a third prediction mode in addition to intra prediction mode and inter prediction mode. In the IBC mode of VTM4.0 (i.e., independent IBC mode), the current picture is no longer included as one of the reference pictures in reference picture list 0. Further, the derivation process of motion vectors for IBC mode excludes all neighboring blocks in inter mode and vice versa. In other words, if a current block is an IBC mode block, motion vectors from neighboring inter mode blocks may not be motion vector prediction candidates for the current block and if the current block is an inter mode block, motion vectors from neighboring IBC mode blocks may not be motion vector prediction candidates for the current block. Bitstream conformance checks are also no longer needed at video encoder 200, and video encoder 200 may remove redundant mode signaling.

Figure 5:
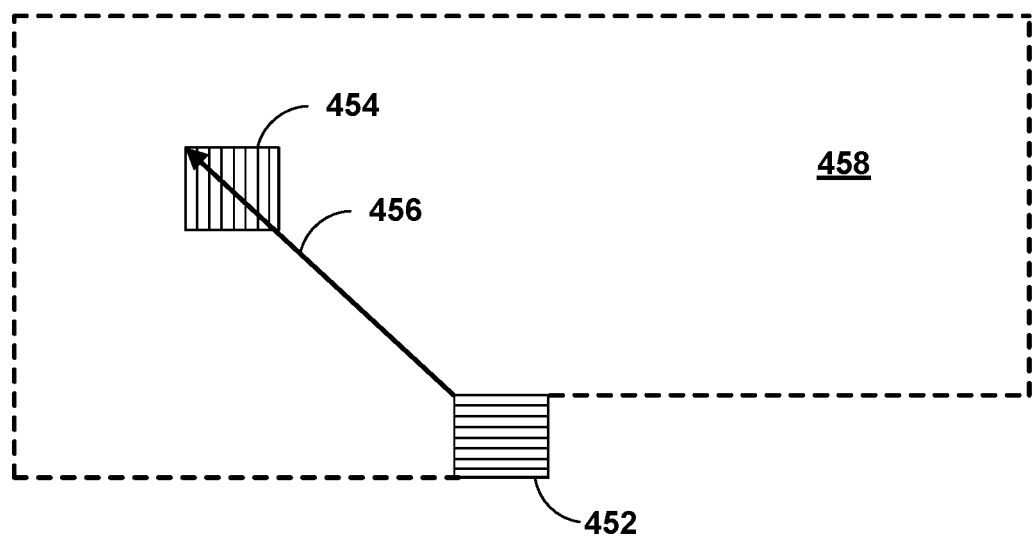
FIG. 5 illustrates an example of an intra block copy (IBC) coding process, in accordance with one or more techniques of this disclosure.

FIG. 5 illustrates an example of an intra block copy (IBC) coding process, in accordance with one or more techniques of this disclosure. According to one example IBC coding process, video encoder 200 may select, for a current block, a predictor video block, e.g., from a set of previously coded and reconstructed blocks of video data located in the current picture. In the example of FIG. 5, area 458 includes the set of previously coded and reconstructed video blocks of the current picture that can be referenced by current block 452. The blocks in the area 458 may represent blocks that have been decoded and reconstructed by video decoder 300 and stored in decoded picture buffer 314, or blocks that have been decoded and reconstructed in the reconstruction loop of video encoder 200 and stored in decoded picture buffer 218. Current block 452 represents a current block of video data to be coded. Prediction block 454 represents a reconstructed video block, in the same picture as current block 452, which is used for IBC prediction of current block 452.

In the example IBC process, video encoder 200 may determine and encode motion vector 456, which indicates the position of prediction block 454 relative to current block 452, together with the residue signal. For instance, as illustrated by FIG. 5, motion vector 456 may indicate the position of the upper-left corner of prediction block 454 relative to the upper-left corner of current block 452. Motion vector 456 may also be referred to as an offset vector, displacement vector, or block vector (BV). Video decoder 300 may utilize the encoded information for decoding the current block.

As discussed above, in IBC mode, the reference area (e.g., area 458) may be restricted to reconstructed samples of a current picture that is being predicted. In other examples, the reference area may be further restricted, such as to a slice, a tile, a CTU, a parallel processing unit, and the like, of the current picture.

The current IBC techniques in JVET, which was adopted in the 13$^{th}$ JVET meeting, may present one or more potential challenges. While the current method of merge/skip candidates list generation for IBC merge/skip mode is similar to normal inter merge/skip mode, IBC mode is different from normal inter prediction in several ways. For example, the area referenced in IBC mode is required to be an area in the current picture, the motion vector of IBC cannot be zero, and the motion vector cannot point to an area that has not yet been coded or is outside of a reference area. This disclosure describes several techniques for addressing these issues in ways that optimizes coding of video data.

In accordance with one or more techniques of this disclosure, a video coder (e.g., a video encoder, such as video encoder 200 of FIG. 1 and/or FIG. 6, or a video decoder, such as video decoder 300 of FIG. 1 and/or FIG. 7) may be configured to determine whether a motion vector (MV) is an illegal motion vector. The video coder may be configured to perform one or more actions in response to determining that a MV is an illegal MV. For instance, in IBC mode, if a current block selects an illegal motion vector (MV), or if there are no legal reconstructed samples that can be used as reference for the current block, the video coder may use a special processing method for the current block. Throughout this disclosure, a special processing method is also referred to as an alternative processing method, and both terms refer to the same set of methods described herein as a special processing method or an alternative processing method.

As one example, the video coder may utilize a special processing method for a first block of an independent processing area. The independent processing area can, for example, be a picture, a slice, a tile or a parallel process unit. Because no other blocks in the independent processing area is reconstructed before the video coder encounters the first block of the processing area, there may be no reconstructed samples in the independent processing area that are available as a reference for the first block of the independent processing area. Thus, the video coder may utilize a special processing method to code the first block of an independent processing area in lieu of a motion vector that references an area in the independent processing area.

As another example, the video coder may use a special processing method for a current block coded using IBC mode (e.g., IBC merge/skip mode, IBC AMVP mode, etc.) if the current block selects an illegal motion vector (MV) pointing to an illegal area. In this example, if the MV of the merge/skip candidates point to an illegal area, it is an illegal MV. In this example, an illegal area means that the area referenced by the MV selected by the current block cannot be used as reference for coding the current block because 1) the referenced area has not been coded, 2) the referenced area has been defined as not being usable as a reference for the current block, or 3) the referenced area is out of an available reference region. In this example, the MV for the current block may instead be derived from a neighboring block of the current block or from virtual MVs (such as pairwise MV). In this example, for chroma IBC prediction, the MV of a chroma block can be inherited from the corresponding luma blocks.

The following techniques are some examples of the aforementioned special processing method.

In one example, to code a current block using a special processing method when the current block selects an illegal MV, the video coder (e.g., video encoder 200 and/or video decoder 300) may use a default value N as the prediction for the current block. In some examples, the default value N can be predefined at the encoder side (e.g., in video encoder 200) and/or at the decoder side (e.g., video decoder 300), or may be set as a value signaled from the video encoder to the video decoder at sequence level, picture level, slice level, or block level. For instance, this value can be signaled in a Sequence Parameter Set (SPS), a Picture Parameter Set (PPS), a Slice header (SH), a Coding Tree Unit (CTU) or a Coding Unit (CU). In some examples, the default value N can be the median valve of the sample value. The default value N can depend on the bit depth of the sample and the internal bit depth of the sample. For example, in the following equation, where the bit depth of samples in processing is represented by to bitDepth$_i$, and where i represents components of luma, and chroma, the default median value N may be computed as N$_i$=1<<(bitDepth$_i$-1). In one specific example using the equation, if the bit depth is 10, then the default value N is equal to 512=1<<(10-1).

In another example, to code a current block using a special processing method when the current block selects an illegal MV, the video coder may code the current block using intra prediction. In some examples, the video coder may use a default intra prediction mode to code the current block. The default intra prediction mode can be predefined in both encoder side and decoder side, or may be set as a value signaled from the encoder to the decoder at a sequence level, a picture level, a slice level, or a block level. For instance, this value can be signaled in a Sequence Parameter Set (SPS), a Picture Parameter Set (PPS), a Slice header (SH), a Coding Tree Unit (CTU) or a Coding Unit (CU). The intra prediction mode can be DC, Planar, Vertical, Horizontal, or any of the other intra prediction modes.

In some examples, instead of using a default intra prediction mode, the coding block can select an intra prediction mode from a set of available intra prediction modes, and signal the selected intra prediction mode. The set of intra prediction modes can be predefined in both encoder side and decoder side, or may be set as a value signaled from the encoder to the decoder at a sequence level, a picture level, a slice level, or a block level. For instance, this value can be signaled in a Sequence Parameter Set (SPS), a Picture Parameter Set (PPS), a Slice header (SH), a Coding Tree Unit (CTU) or a Coding Unit (CU). The intra prediction mode can be DC, Planar, Vertical, Horizontal, or any of the other intra prediction modes.

In some examples, the video coder may be configured to refrain from adding illegal MV candidates into the merge/skip candidate list. For instance, the video coder may only add legal MVs into the list by checking whether each MV candidate represents a legal MV for IBC mode and by refraining from adding MV candidates that represent illegal MVs for IBC mode to the merge/skip candidate list.

In some examples, if the video coder is configured to refrain from adding illegal MV candidates to the merge/skip candidate list, the video coder may add special processing mode into the merge/skip candidates list if the number of legal MV candidates in the merge/skip candidate list is fewer than the maximum size of the list. For instance, if the number of the legal MVs in a merge/skip candidate list is fewer than the size of merge/skip candidate list (e.g., few than a maximum size), the video coder may add special processing methods as discussed above, so that the total number of candidates and special processing methods in the list is less than or equal to the maximum size of the list. For example, the special processing method may be using the default value N as the prediction method, as discussed above. In this example, the video coder may use illegal MVs (such as zero MV having the value (0, 0), because zero MV is illegal for IBC mode) or illegal reference to fill the merge/skip candidate list. If the block selects an illegal candidate from the list, such as by selecting a zero MV, the video coder can use default value N to predict the samples in the current block, as described above. In a specific example, if the maximum size of IBC merge/skip candidate list is 6, and if there are only 3 legal MV candidates {MV0, MV1, MV2} in the list, the video coder may fill the rest of the list with special processing methods to result in an IBC merge/skip candidate list of {MV0, MV1, MV2, zero MV, zero MV, zero MV}. If the block selects the zero MV, the video coder may use the default value N to predict the samples in the current block.

As another example, the techniques of this disclosure may equally be applicable for any tools that use motion vector predictor list, such as merge/skip list, or AMVP list, or any other motion vector predictor candidate lists. In one example, the techniques of this disclosure may equally be applicable to any tools that require deriving a candidate list based on neighbor information.

Figure 6:
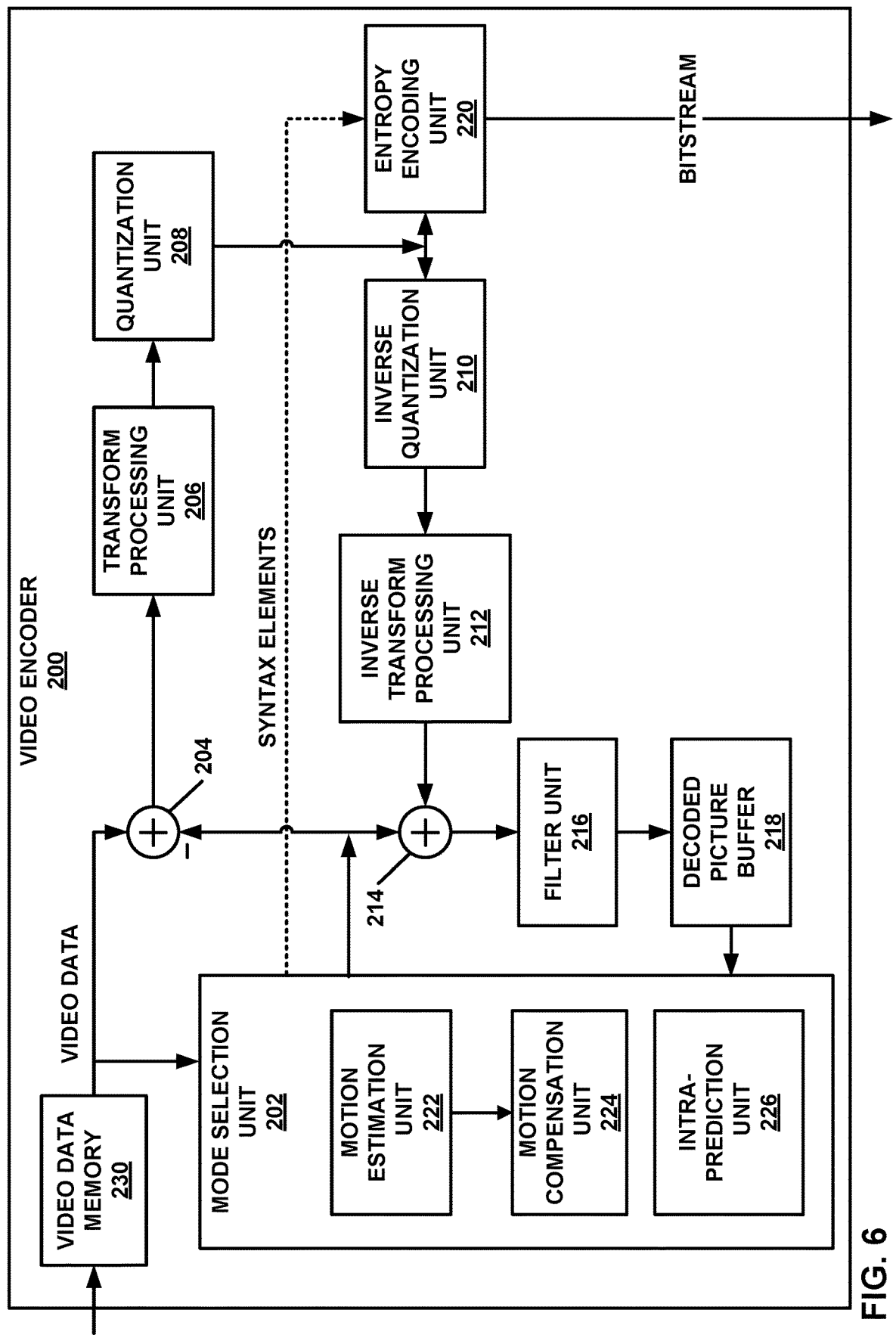
FIG. 6 is a block diagram illustrating an example video encoder that may perform the techniques of this disclosure.

FIG. 6 is a block diagram illustrating an example video encoder 200 that may perform the techniques of this disclosure. FIG. 6 is provided for purposes of explanation and should not be considered limiting of the techniques as broadly exemplified and described in this disclosure. For purposes of explanation, this disclosure describes video encoder 200 according to the techniques of JEM, VVC (ITU-T H.266, under development), and HEVC (ITU-T H.265). However, the techniques of this disclosure may be performed by video encoding devices that are configured to other video coding standards.

In the example of FIG. 6, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 6 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU).

For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

In another example, for intra block copy, mode selection unit 202 may perform a motion search to identify one or more closely matching reference blocks in already coded areas of the current picture, and may form one or more motion vectors that define the position of the one or more reference blocks in the current picture relative to the position of the current block, in a manner similar to that performed by motion estimation unit 222 for inter-prediction of the current block. For example, mode selection unit 202 may use a motion vector predictor candidate list, such as described above, such as a merge candidate list, to identify a reference block in the already-coded area of the current picture referenced by a motion vector predictor in the list that closely matches the current block.

In some examples, mode selection unit 202 may determine whether the motion vector predictor for identifying a prediction block for the current block corresponds to a legal motion vector for the current block, via techniques described throughout this disclosure. If mode selection unit 202 determines that the motion vector is not a legal motion vector, such as if the motion vector is a zero motion vector or references a prediction block in an area that cannot be used as the prediction block for the current block, mode selection unit 202 may determine the prediction block for the current block using an alternative processing method, such as the techniques described in this disclosure. For example, mode selection unit 202 may generate the prediction block using an intra prediction mode, using a default value, or any other techniques disclosed herein.

Mode selection unit 202 may then generate a prediction block for the current block using the one or more motion vectors, in a manner similar to that performed by motion compensation unit 224 for inter-prediction of the current block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 7:
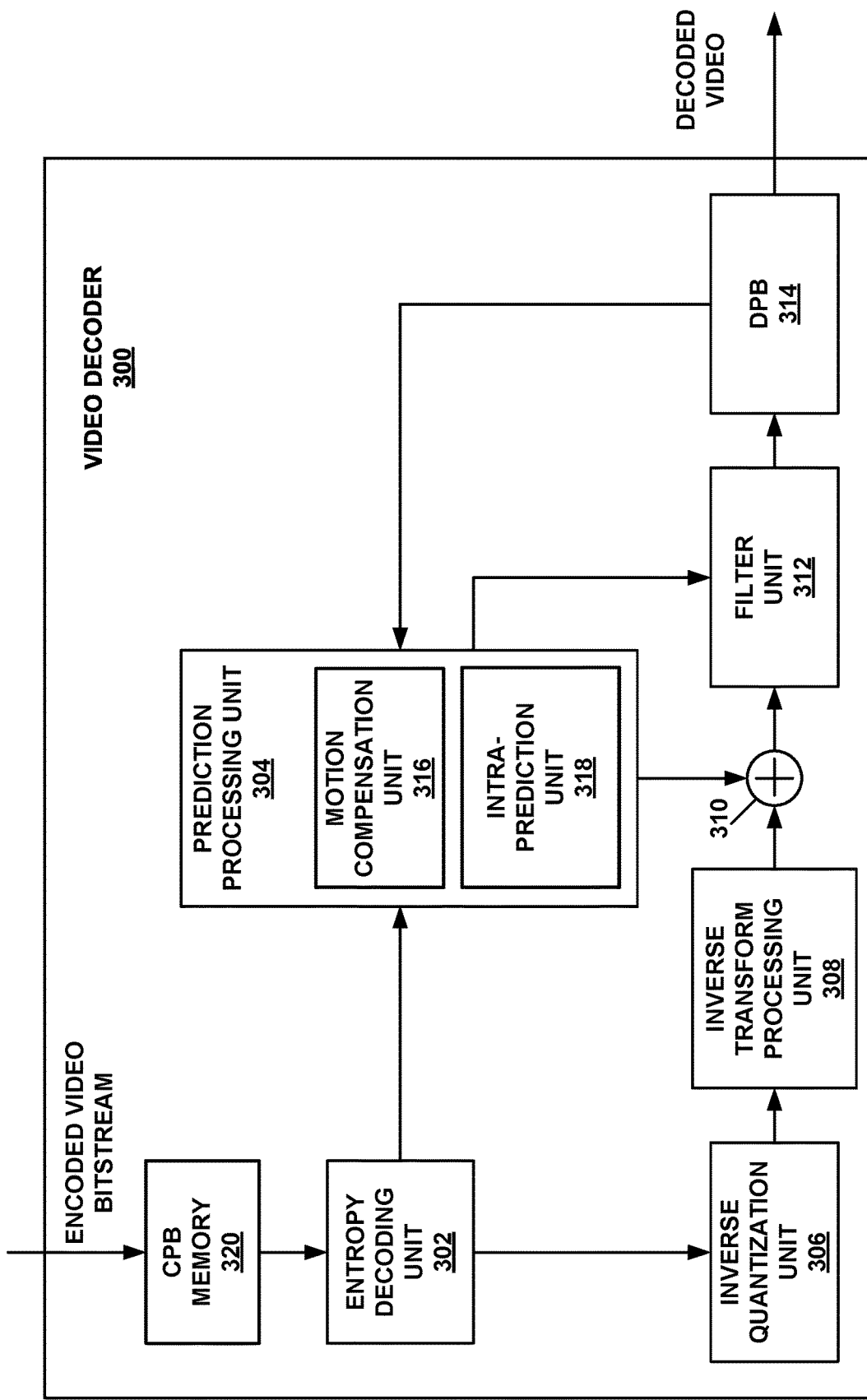
FIG. 7 is a block diagram illustrating an example video decoder that may perform the techniques of this disclosure.

Video encoder 200 represents an example of a device configured to encode video data including a memory configured to store video data, and one or more processing units implemented in circuitry and configured to determine, for a current block of a current picture of the video data, the current block coded using an intra block copy (IBC) mode, whether a motion vector (MV) for identifying a prediction block for the current block is a legal MV and responsive to determining that the MV is not a legal MV, reconstruct samples of the current block using an alternative processing method FIG. 7 is a block diagram illustrating an example video decoder 300 that may perform the techniques of this disclosure. FIG. 7 is provided for purposes of explanation and is not limiting on the techniques as broadly exemplified and described in this disclosure. For purposes of explanation, this disclosure describes video decoder 300 according to the techniques of JEM, VVC (ITU-T H.266, under development), and HEVC (ITU-T H.265). However, the techniques of this disclosure may be performed by video coding devices that are configured to other video coding standards.

In the example of FIG. 7, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318 and may perform the techniques of the present disclosure. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 7 are illustrated to assist with understanding the operations performed by video decoder 300. The units may be implemented as fixed-function circuits, programmable circuits, or a combination thereof. Similar to FIG. 6, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 6).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 6). Intra-prediction unit 318 may retrieve data of neighboring samples to the current block from DPB 314.

Prediction processing unit 304 may perform the techniques of the present disclosure. For example, prediction processing unit 304 may determine if the prediction syntax elements indicate that the current block is encoded using an inter block copy (IBC) mode, such as by determining if the prediction information syntax elements indicate that the current block is coded using an IBC mode. If prediction processing unit 304 determines that the current block is encoded using an IBC mode, prediction processing unit 304 may determine whether a motion vector that identifies a prediction block for the current block is legal.

For example, prediction processing unit 304 may determine, based on information obtained from a bitstream, the index into a motion vector candidate list that include motion vector predictor candidates for identifying a prediction block for the current block according to the IBC mode. Prediction processing unit 304 may generate the motion vector candidate predictor list and may determine, based on the index, the selected motion vector predictor candidate, such as by using motion vector difference components for the current block. Prediction processing unit 304 may generate a motion vector for the current block using the selected motion vector predictor candidate via any suitable technique and may determine if the motion vector candidate is a legal motion vector in IBC mode. If prediction processing unit 304 determines that the motion vector is legal, intra-prediction unit 318 may perform an IBC process to determine the prediction block for the current block using the motion vector. However, if prediction processing unit 304 determines that the motion vector is not legal, intra-prediction unit 318 may not be able to determine the prediction block for the current block using the motion vector.

As described above, when a current block is coded using the IBC mode, a motion vector identifies a prediction block in the current picture that is to be used as a reference for reconstructing the samples of the current block. However, the motion vector for identifying a prediction block in the current picture may not always be legal, such as due to errors by encoder 200 in encoding the video data, errors in transmitting the video data to decoder 300, errors by decoder 300, and the like.

A motion vector may not be legal if it has a value of zero (e.g., a value of (0, 0)) or if it identifies an area that cannot be used as a reference for reconstructing the samples of the current block using an IBC mode. The IBC mode may be, for example, an IBC AMVP mode, an IBC merge/skip mode, an independent IBC mode, and the like. In IBC, it may be a requirement that, for a current block in the current picture, the motion vector identifies an area (e.g., a block) in the current picture as the prediction block for the current block. In particular, it may be a requirement that the motion vector identifies an area in the current picture that have already been reconstructed (e.g., by reconstruction unit 310) as the prediction block for the current block when prediction processing unit 304 is determining the prediction block for the current block. Thus, if prediction processing unit 304 determines that the motion vector identifiers a prediction block in a different picture or in an area of the current picture that has yet to be reconstructed, prediction processing unit 304 may determine that the motion vector is illegal.

In some example, decoder 300 may define an available reference region within the already reconstructed area of the current picture as being available for use as a prediction block for the current block. Such an available reference region may be predefined in decoder 300, signaled in the bitstream received from encoder 200, defined via one or more settings of decoder 300, and the like. For example, the available reference region may be defined as the 64×64 area of the current picture to the left of the current block. As such, in these examples, it may be required that, for a current block in the current picture, the motion vector identifies an area within the available reference region in the current picture as the prediction block for the current block. Thus, if prediction processing unit 304 determines that the motion vector identifiers a prediction block in an area of the current picture outside of the available reference region, even if the identified prediction block is within the already reconstructed area of the current picture, prediction processing unit 304 may determine that the motion vector is illegal.

In some examples, the first block of an independent processing area may not have any reconstructed samples that can be used as a reference for the current block. An independent processing area may be a picture, a slice, a tile, or a parallel processing unit, and, in some examples, a block in an independent processing area may be restricted to using reconstructed samples within the same independent processing area as a reference. As such, a first block of an independent area may not have any reconstructed samples that can be used as a reference for the current block. In this case, prediction processing unit 304 may determine that a motion vector for a current block is not legal if the current block is the first block of the independent processing area and, in response to determining that the current block is the first block of an independent processing area, prediction processing unit 304 may decode the current block using an alternative processing method as described below.

If decoder 300 determines that the motion vector for identifying a prediction block for the current block is not legal, decoder 300 may decode the current block using an alternative processing method. In particular, if prediction processing unit 304 determines that the motion vector for identifying a prediction block for the current block is not legal, prediction processing unit 304 may determine a prediction block for the current block without using the illegal motion vector. Some examples of the alternative processing method for decoding the current block are described below, including techniques for determining a prediction block for the current block without use of the motion vector that has been determined to not be legal.

In some examples, if prediction processing unit 304 determines that the motion vector for identifying a prediction block for the current block is not legal, prediction processing unit 304 may determine a prediction block for the current block based at least in part on a neighboring block to the current block by deriving a motion vector from a neighboring block to the current block, such as a neighboring left block, a neighboring top block, and the like. For example, prediction processing unit 304 may use the motion vector from a neighboring block to identify the prediction block for the current block. Because the position of the neighboring block is different from the position of the current block, using the motion vector for a neighboring block to identify the prediction block for the current block may result in prediction processing unit 304 identifying a prediction block for the current block that is different from the prediction block for the neighboring block.

In some examples, if the current block is a chroma block, and if prediction processing unit 304 determines that the motion vector for identifying a prediction block for the current block is not legal, prediction processing unit 304 may use the motion vector of the corresponding luma block that identifies the prediction block for the corresponding luma block as the motion vector for identifying the prediction block for the current block. In some examples, prediction processing unit 304 may determine whether the motion vector that identifies the prediction block for the corresponding luma block is a legal motion vector and may use the motion vector of the corresponding luma block that identifies the prediction block for the corresponding luma block as the motion vector for identifying the prediction block for the current block if the motion vector for the corresponding luma block is legal.

In some examples, if prediction processing unit 304 determines that the motion vector for identifying a prediction block for the current block is not legal, prediction processing unit 304 may generate a prediction block having samples set to a default value as the prediction block for the current block. In one example, the default value may be a value that is predefined at encoder 200 and/or decoder 300. In another example, the default value may be a value that is signaled from encoder 200 to decoder 300, such as at a sequence level in the Sequence Parameter Set (SPS), a picture level in the Picture Parameter Set (PPS), a slice level in the Slice Header (SH), or a block level in the Coding Tree Unit (CTU) or Coding Unit (CU).

A video coder, such as video encoder 200 or video decoder 300, may perform intra prediction using an intra prediction mode selected from a plurality of available intra prediction modes. The intra prediction modes may include non-directional intra prediction modes and directional intra prediction modes, which may also be referred to as intra prediction directions. For instance, some video coding specifications provide sixty-seven intra-prediction modes, including various directional modes, as well as a planar mode and a DC mode. Different directional intra prediction modes correspond to different angles. In some examples, to determine a value of a current sample of a prediction block using a directional intra prediction mode, the video coder may determine a point where a line passing through the current sample at the angle corresponding to the directional intra prediction mode intersects a set of border samples. The border samples may comprise samples in a column immediately left of the prediction block and samples in a row immediately above the prediction block. If the point is between two of the border samples, the video coder may interpolate or otherwise determine a value corresponding to the point. If the point corresponds to a single one of the border samples, the video coder may determine that the value of the point is equal to the border sample. The video coder may set the value of the current sample of the prediction block equal to the determined value of the point.

In some examples, if prediction processing unit 304 determines that the motion vector for identifying a prediction block for the current block is not legal, prediction processing unit 304 may generate, for the current block, a prediction block having samples set to a default value. The default value may be a default value for generating samples of the prediction block. For example, the default value may be, for each sample in the current block, a median value of the sample value of a sample. The default value may be based on the bit depth of the sample and/or an internal bit depth. For example, prediction processing unit 304 may determine a default value N for a sample of a current block based on the bit depth of the sample as follows: $N_i=1<<(bitDepth_i-1)$, where the bit depth of sample is equal to $bitDepth_i$, where i is components of luma, and chroma, and where $<<$ is a left shift operator. In a specific example, if the bit depth of the sample is 10, then the default value N for the sample is equal to $512=1<<(10-1)$.

In some examples, if prediction processing unit 304 determines that the motion vector for identifying a prediction block for the current block is not legal, prediction processing unit 304 may use a default intra prediction mode to code the current block. Examples of the default prediction mode may include any suitable intra prediction mode such as vertical mode, horizontal mode, planar mode, DC mode, and the like. In one example, the default intra prediction mode be predefined at encoder 200 and/or decoder 300. In another example, the default intra prediction mode may be signaled from encoder 200 to decoder 300, such as at a sequence level in the Sequence Parameter Set (SPS), a picture level in the Picture Parameter Set (PPS), a slice level in the Slice Header (SH), or a block level in the Coding Tree Unit (CTU) or Coding Unit (CU).

In another example, instead of coding the current block using a default intra prediction mode, prediction processing unit 304 may select an intra prediction mode from a set of available intra prediction modes to code the current block. Examples of the set of available prediction modes may include any combination of suitable intra prediction modes such as vertical mode, horizontal mode, planar mode, DC mode, and the like. In one example, the set of available intra prediction modes be predefined at encoder 200 and/or decoder 300. In another example, the set of available intra prediction modes may be signaled from encoder 200 to decoder 300, such as at a sequence level in the Sequence Parameter Set (SPS), a picture level in the Picture Parameter Set (PPS), a slice level in the Slice Header (SH), or a block level in the Coding Tree Unit (CTU) or Coding Unit (CU).

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine, for a current block of a current picture of the video data, the current block coded using an intra block copy (IBC) mode, whether a motion vector (MV) for identifying a prediction block for the current block is a legal MV and responsive to determining that the MV is not a legal MV, reconstruct samples of the current block using an alternative processing method.

In some examples, to code a current a current block using IBC, video encoder 200 (e.g., mode selection unit 202) and/or video decoder 300 (e.g., prediction processing unit 304) may generate a motion vector candidate list (also referred to as a motion vector predictor list). The motion vector candidate list may be generated for each block that is to be coded using IBC, or may be shared amongst a plurality of blocks that are to be coded using IBC. For example, a motion vector candidate list may include a list of motion vector candidates, where each motion vector candidate in the motion vector candidate list represents a motion vector that identifies an area in the current picture for use as a reference for reconstructing the samples of a block (e.g., the current block) of the current picture.

In some examples, video encoder 200 and/or video decoder 300 may generate motion vector candidate lists in ways that do not include any illegal motion vectors. For example, video encoder 200 (e.g., mode selection unit 202) and/or video decoder 300 (e.g., prediction processing unit 304) may generate one or more motion vector predictor candidates and may determine whether each of the one or more motion vector predictor candidates is legal, such as according to the techniques disclosed throughout this disclosure. For example, video encoder and/or video decoder 300 may determine whether each of the one or more motion vector predictor candidates reference an area of the current picture that is available as a reference for coding the current block using IBC. If a motion vector predictor candidate does not reference an area of the current picture that is available as a reference for coding the current block using IBC, video encoder 200 and/or video decoder 300 may determine that the motion vector predictor candidate is illegal. Video encoder 200 (e.g., mode selection unit 202) and/or video decoder 300 (e.g., prediction processing unit 304) may include each of the one or more motion vector candidates determined to be legal in the motion vector candidate list. In some examples, video encoder 200 and video decoder 300 may also refrain from including each of the one or more motion vector candidates determined not to be legal in the motion vector candidate list.

In some examples, a motion vector candidate list may have a defined size, such as a maximum size. This size of the motion vector candidate list may be predefined at encoder 200 and/or decoder 300, or may be signaled from encoder 200 to decoder 300, such as at a sequence level in the Sequence Parameter Set (SPS), a picture level in the Picture Parameter Set (PPS), a slice level in the Slice Header (SH), or a block level in the Coding Tree Unit (CTU) or Coding Unit (CU). Examples of a maximum size for a motion vector candidate list may be 5, 6, and the like.

In the case that a motion vector candidate list has a maximum size, and if the number of legal motion vectors included in the motion vector candidate list is fewer than the maximum size, video encoder 200 (e.g., mode selection unit 202) and/or video decoder 300 (e.g., prediction processing unit 304) may fill the remainder of the motion candidate list by inserting one or more alternative processing methods into the motion vector candidate list, so that the number of motion vectors and the number of alternative processing methods in the motion vector candidate list is less than or equal to the maximum size of the motion vector candidate list. The alternative processing method may include any one or more of the alternative processing methods described above, such as a default value for samples, an intra prediction mode, a set of intra prediction modes, and the like.

To insert one or more alternative processing methods in the motion vector candidate list, video encoder 200 (e.g., mode selection unit 202) and/or video decoder 300 (e.g., prediction processing unit 304) may insert data representing one or more alternative processing methods in the motion vector list. For example, video encoder 200 (e.g., mode selection unit 202) and/or video decoder 300 (e.g., prediction processing unit 304) may insert data representing one or more default values for generating one or more samples of a prediction block for the current block into the motion vector list, and/or insert data representing a default value for generating one or more samples of a prediction block for the current block into the motion vector list.

In one example, illegal motion vector predictors, such as zero motion vectors (i.e., motion vectors having values of (0, 0) may be data that represents one or more alternative processing methods. Thus, video encoder 200 and/or video decoder 300 may insert zero motion vectors into a motion vector candidate list as data representing one or more alternative processing methods.

In this example, given a motion vector candidate list having a maximum size of 6, where the motion vector candidate list includes three legal motion vector candidates {MV0, MV1, MV2}, video encoder 200 (e.g., mode selection unit 202) and/or video decoder 300 (e.g., prediction processing unit 304) may fill the remaining three available slots in the motion vector candidate list with three illegal motion vector predictors, such as three motion vector predictors each having a value of zero (e.g., having component values of (0, 0)) (hereafter "zero MV") to generate a motion vector candidate list of {MV0, MV1, MV2, zero MV, zero MV, zero MV}. Each of the illegal zero MVs in the motion vector candidate list may indicate an alternative processing method, such as using a default value for generating one or more samples of a prediction block, as described above. Thus, if video encoder 200 (e.g., mode selection unit 202) and/or video decoder 300 (e.g., prediction processing unit 304) selects one of the illegal motion vector predictor candidates from the motion vector candidate list for generating the prediction block, the alternative processing method represented by the selected illegal motion vector candidate, such as a default value for generating one or more samples of a prediction block, is used to generate the prediction block.

While the techniques described herein for generating a motion vector candidate list is described herein with respect to using IBC to code blocks of video data, such techniques are equally applicable for generating motion vector candidate lists for merge mode, advance motion vector prediction (AMVP) mode, skip mode, or any other modes that derive one or more motion vector candidate lists, such as any techniques that derive one or more motion vector candidate lists based on neighbor information or techniques where motion vector candidates reference areas of the current picture.

Figure 8:
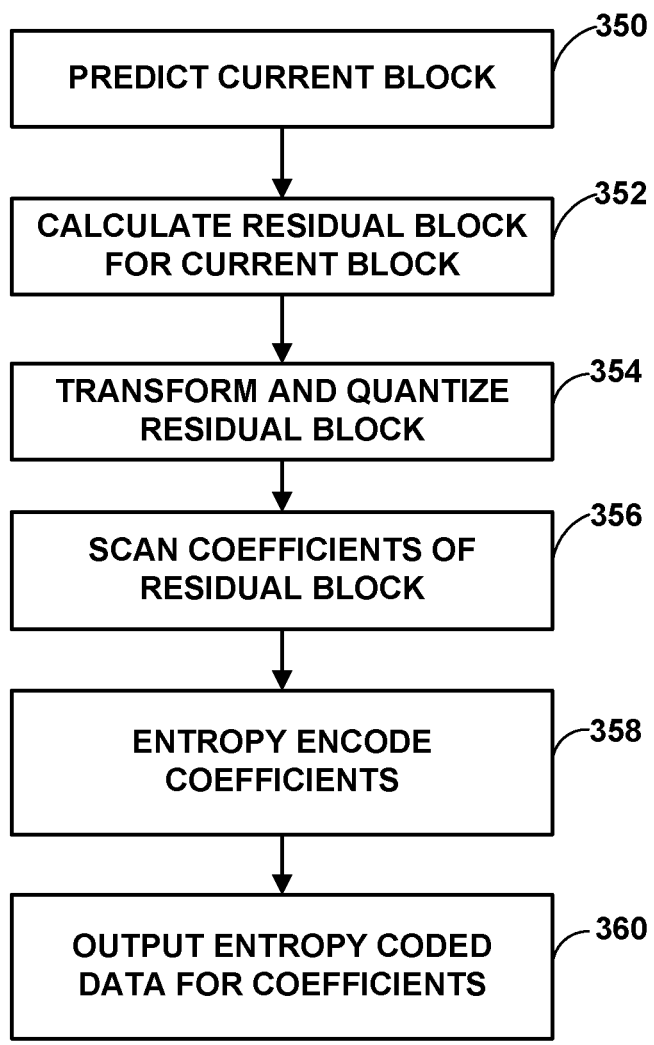
FIG. 8 is a flowchart illustrating an example method for encoding a current block.

FIG. 8 is a flowchart illustrating an example method for encoding a current block. The current block may comprise a current CU. Although described with respect to video encoder 200 (FIGS. 1 and 6), it should be understood that other devices may be configured to perform a method similar to that of FIG. 8.

In this example, video encoder 200 initially predicts the current block (350). For example, video encoder 200 may form a prediction block for the current block. In some examples, video encoder 200 may use IBC mode to form a prediction block for the current block by determining a motion vector that references an area of the current picture as the prediction block for the current block. In some examples, if the block is coded using IBC mode, video encoder 200 may determine whether the motion vector for identifying the prediction block for the current block is legal. For example, the motion vector may be illegal if the motion vector identifies the prediction block in an area that cannot be used as a reference for the current block, such as an area that is not within the reconstructed samples of the current picture or is not within a specified available reference region for the block. In another example, the motion vector may be illegal if the current block is a first block in an independent processing area. In another example, the motion vector may be illegal if the motion vector is a zero motion vector.

If video encoder 200 determines that the motion vector for identifying the prediction block for the current block is legal, video encoder 200 may use the prediction block referenced by the motion vector for encoding the current block. On the other hand, if video encoder 200 determines that the motion vector for identifying the prediction block for the current block is not legal, video encoder 200 may use an alternative processing method for forming the prediction block for the current block. For example, video encoder 200 may use an intra prediction mode to form the prediction block instead of intra copy mode, may determine the prediction block for the current block using a neighboring block to the current block, or may generate the prediction block for the current block from one or more default values. In another example, if the current block is a luma block, video encoder 200 may enable the current block to inherit a motion vector from a corresponding luma block that references a prediction block for the current block.

Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 9:
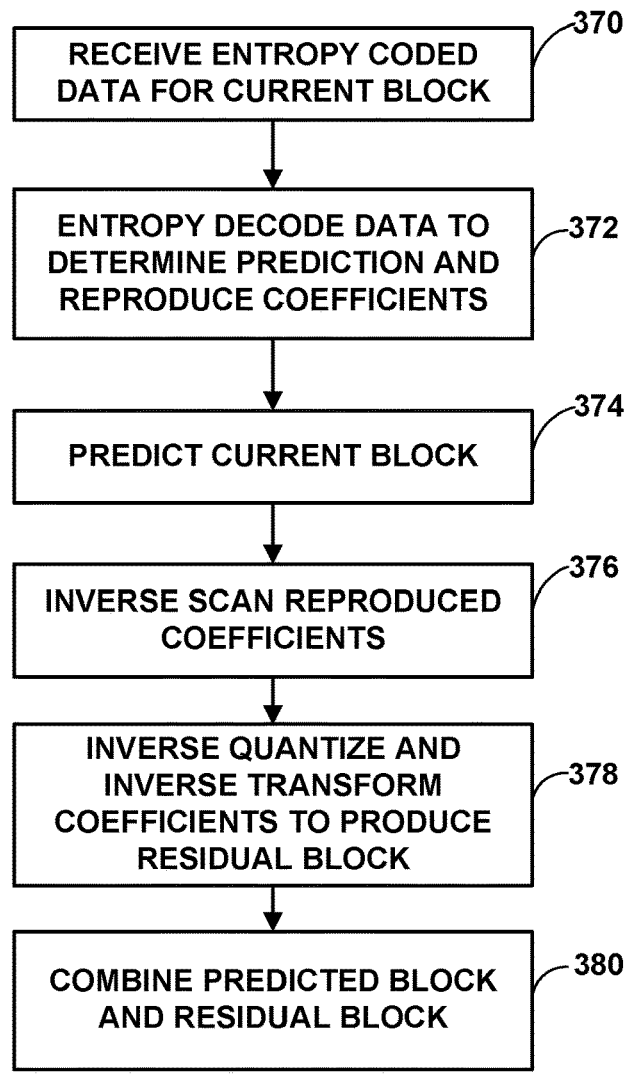
FIG. 9 is a flowchart illustrating an example method for decoding a current block.

FIG. 9 is a flowchart illustrating an example method for decoding a current block of video data. The current block may comprise a current CU. Although described with respect to video decoder 300 (FIGS. 1 and 7), it should be understood that other devices may be configured to perform a method similar to that of FIG. 9.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an IBC mode, an intra-prediction mode, or an inter-prediction mode as indicated by the prediction information for the current block, to calculate a prediction block for the current block. When video decoder 300 predicts the current block using an IBC mode, video decoder may determine whether a motion vector for identifying a prediction block for the current block is a legal motion vector. If video decoder 300 determines that the motion vector is not a legal motion vector, video decoder 300 may reconstruct samples of the current block using an alternative processing method.

For example, the motion vector may be illegal if the motion vector identifies the prediction block in an area that cannot be used as a reference for the current block, such as an area that is not within the reconstructed samples of the current picture or is not within a specified available reference region for the block. In another example, the motion vector may be illegal if the current block is a first block in an independent processing area. In another example, the motion vector may be illegal if the motion vector is a zero motion vector.

If video decoder 300 determines that the motion vector for identifying the prediction block for the current block is legal, video decoder 300 may use the prediction block referenced by the motion vector for encoding the current block. On the other hand, if video decoder 300 determines that the motion vector for identifying the prediction block for the current block is not legal, video decoder 300 may use an alternative processing method for forming the prediction block for the current block. For example, video decoder 300 may use an intra prediction mode to form the prediction block instead of intra copy mode, may determine the prediction block for the current block using a neighboring block to the current block, or may generate the prediction block for the current block from one or more default values. In another example, if the current block is a luma block, video encoder 200 may enable the current block to inherit a motion vector from a corresponding luma block that references a prediction block for the current block.

Video decoder 300 may then inverse scan the reproduced coefficients (376), to create a block of quantized transform coefficients. Video decoder 300 may then inverse quantize and inverse transform the transform coefficients to produce a residual block (378). Video decoder 300 may ultimately decode the current block by combining the prediction block and the residual block (380).

Figure 10:
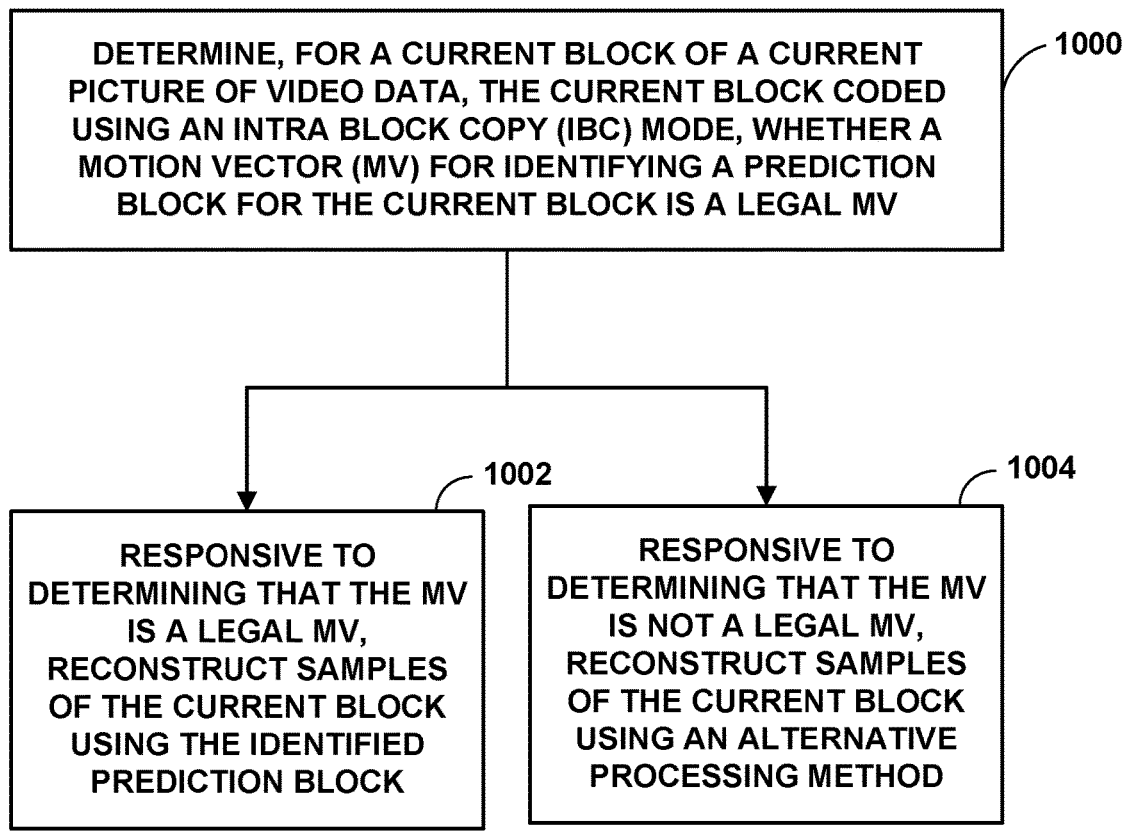
FIG. 10 is a flowchart illustrating an example method for processing illegal motion vectors for intra block copy mode in video coding, in accordance with the techniques of this disclosure.

FIG. 10 is a flowchart illustrating an example method for processing illegal motion vectors for intra block copy mode in video coding, in accordance with the techniques of this disclosure. The example method illustrated in FIG. 10 may be performed as part of the example methods illustrated FIGS. 8 and 9. For example, the example method illustrated in FIG. 10 may be performed as part of predicting the current block in the example method illustrated in FIG. 8 and/or as part of predicting the current block in the example method illustrated in FIG. 9. The current block may, for example, comprise a current coding block of a current coding tree unit (CTU). Although described with respect to video decoder 300 (FIGS. 1 and 7) and video encoder 200 (FIGS. 1 and 6), it should be understood that other devices may be configured to perform a method similar to that of FIG. 10.

A video coder (e.g., video encoder 200 and/or video decoder 300) may determining, for a current block of a current picture of video data, the current block coded using an intra block copy (IBC) mode, whether a motion vector (MV) for identifying a prediction block for the current block is a legal MV (1000). For example, the video coder may determine that the MV identifies the prediction block in an area that cannot be used as a reference for the current block. The area that cannot be used as a reference for the current block is not within reconstructed samples of the current picture, or the area that cannot be used as a reference for the current block is not within an available reference region for the current block. In another example, the video coder may determine that the MV identifies the prediction block in an area that cannot be used as a reference for the current block by determining that the current block is a first block in an independent processing area. In another example, the video coder may determine that the MV is a zero MV (e.g., a motion vector with values of (0, 0)).

The video coder may, responsive to determining that the MV is a legal MV, reconstructing samples of the current block using the referenced prediction block (1002). For example, the video coder may form a residual block for the current block and may combine the prediction block and the residual block to form reconstructed samples of the current block.

The video coder may, responsive to determining that the MV is not a legal MV, reconstructing samples of the current block using an alternative processing method (1004). In one example, reconstructing samples of the current block using an alternative processing method includes generating the prediction block for the current block, the prediction block having one or more samples determined from one or more default values, and reconstructing the samples of the current block using the prediction block.

In another example, reconstructing samples of the current block using an alternative processing method includes reconstructing the samples of the current block using an intra prediction mode. In another example, reconstructing samples of the current block using an alternative processing method includes determining the prediction block for the current block based at least in part on a neighboring block to the current block. In another example, when the current block comprises a chroma block, reconstructing samples of the current block using an alternative processing method includes inheriting a new motion vector for identifying the prediction block for the current block from a corresponding luma block.

In some examples, the video coder (e.g., video encoder 200 and/or video decoder 300) may generate a motion vector (MV) candidate list for the current block, including: generating one or more MV predictor candidates, determining whether each of the one or more MV predictor candidates is a legal MV predictor, including each of the one or more MV predictor candidates determined to be a legal MV predictor in the MV candidate list, and refraining from including each of the one or more MV predictor candidates determined not to be a legal MV predictor in the MV candidate list.

In some examples, the video coder (e.g., video encoder 200 and/or video decoder 300) may further, responsive to determining that a number of candidates includes in the MV candidate list is less than a maximum size, inserting one or more alternative processing methods into the MV candidate list. In some examples, inserting one or more alternative processing methods into the MV candidate list includes at least one of: inserting data representing a default value for generating one or more samples of the prediction block into the MV candidate list or inserting data representing an intra prediction mode into the MV candidate list.

Illustrative examples of the disclosure include:

Example 1

A method of coding video data, the method comprising any combination of the techniques described in this disclosure.

Example 2

A method of coding video data, the method comprising: determining whether a motion vector (MV) for a current block coded using intra block copy (IBC) is illegal; and responsive to determining that the MV is illegal, coding the current block using special processing methods.

Example 3

The method according to Example 2, wherein determining that the MV is illegal comprises: determining that the MV identifies a prediction block in an illegal area.

Example 4

The method according to Example 3, wherein determining that the MV identifies a predictor block in an illegal area comprises: determining that the MV identifies a predictor block in an area that cannot be used as reference for the current block.

Example 5

The method according to any of Examples 2-4, wherein coding the current block using special processing methods comprises: generating a prediction block for the current block, the prediction block having samples set to a default value.

Example 6

The method of any of Examples 2-4, wherein coding the current block using special processing methods comprises: coding the current block using intra prediction.

Example 7

The method according to any of Examples 2-6, further comprising: generating a motion vector (MV) candidate list for the current block, wherein generating the MV candidate list comprises: generating one or more MV candidates; determining whether each of the MV candidates are illegal; not including MV candidates determined to be illegal in the MV candidate list.

Example 8

The method according to Example 7, wherein generating the MV candidate list further comprises: including MV candidates not determined to be illegal in the MV candidate list.

Example 9

The method according to Example 8, further comprising: responsive to determining that a number of candidates includes in the MV candidate list is less than a maximum size, inserting one or more special processing modes into the MV candidate list.

Example 10

The method according to Example 9, wherein inserting one or more special processing modes into the MV candidate list comprises: inserting data representing a default value predictor block into the MV candidate list; and/or inserting data representing an intra prediction method into the MV candidate list.

Example 11

The method according to any combination of Examples 1-10, wherein coding comprises decoding.

Example 12

The method according to any combination of Examples 1-11, wherein coding comprises encoding.

Example 13

A device for coding video data, the device comprising one or more means for performing the method according to any combination of Examples 1-12.

Example 14

The device according to Example 13, wherein the one or more means comprise one or more processors implemented in circuitry.

Example 15

The device according to any combination of Examples 13 and 14, further comprising a memory to store the video data.

Example 16

The device according to any combination of Examples 13-15, further comprising a display configured to display decoded video data.

Example 17

The device according to any combination of Examples 13-16, wherein the device comprises one or more of a camera, a computer, a mobile device, a broadcast receiver device, or a set-top box.

Example 18

The device according to any combination of Examples 13-17, wherein the device comprises a video decoder.

Example 19

The device according to any combination of Examples 13-18, wherein the device comprises a video encoder.

Example 20

A computer-readable storage medium having stored thereon instructions that, when executed, cause one or more processors to perform the method according to any combination of claims 1-12.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
determining, by processing circuitry for a current block of a current picture of video data, the current block coded using an intra block copy (IBC) mode, that a motion vector (MV) for identifying a prediction block for the current block is not a legal MV; and
responsive to determining that the MV is not a legal MV, reconstructing, by the processing circuitry, samples of the current block using an alternative processing method, including one of: generating the prediction block having one or more samples determined from one or more default values, reconstructing the samples of the current block using an intra prediction mode, determining the prediction block based at least in part on a neighboring block to the current block, or inheriting, from a corresponding luma block, a new motion vector for identifying the prediction block for the current block.

2. The method of claim 1, wherein determining that the MV is not a legal MV comprises:
determining, by the processing circuitry, that the MV identifies the prediction block in an area that cannot be used as a reference for the current block.

3. The method of claim 2, wherein the area that cannot be used as a reference for the current block is not within reconstructed samples of the current picture.

4. The method of claim 2, wherein the area that cannot be used as a reference for the current block is not within an available reference region for the current block.

5. The method of claim 1, wherein determining that the MV is not a legal MV comprises:
determining, by the processing circuitry, that the current block is a first block in an independent processing area.

6. The method of claim 1, wherein determining that the MV is not a legal MV comprises:
determining, by the processing circuitry, that the MV is a zero MV.

7. The method of claim 1, further comprising:
generating, by the processing circuitry, a motion vector (MV) candidate list for the current block, including:
generating, by the processing circuitry, one or more MV predictor candidates;
determining, by the processing circuitry, whether each of the one or more MV predictor candidates is a legal MV predictor;
including, by the processing circuitry, each of the one or more MV predictor candidates determined to be a legal MV predictor in the MV candidate list; and
refraining, by the processing circuitry, from including each of the one or more MV predictor candidates determined not to be a legal MV predictor in the MV candidate list.

8. The method of claim 7, further comprising:
responsive to determining that a number of candidates included in the MV candidate list is less than a maximum size, inserting, by the processing circuitry, one or more alternative processing methods into the MV candidate list.

9. The method of claim 8, wherein inserting one or more alternative processing methods into the MV candidate list comprises at least one of:
inserting, by the processing circuitry, data representing a default value for generating one or more samples of the prediction block into the MV candidate list; or
inserting, by the processing circuitry, data representing an intra prediction mode into the MV candidate list.

10. A device for coding video data, the device comprising:
a memory configured to store the video data;
one or more processors implemented in circuitry and configured to:
determine, for a current block of a current picture of the video data, the current block coded using an intra block copy (IBC) mode, that a motion vector (MV) for identifying a prediction block for the current block is not a legal MV; and
responsive to determining that the MV is not a legal MV, reconstruct samples of the current block using an alternative processing method, including one of: generating the prediction block having one or more samples determined from one or more default values, reconstructing the samples of the current block using an intra prediction mode, determining the prediction block based at least in part on a neighboring block to the current block, or inheriting, from a corresponding luma block, a new motion vector for identifying the prediction block for the current block.

11. The device of claim 10, wherein the one or more processors configured to determine that the MV is not a legal MV are further configured to:
determine that the MV identifies the prediction block in an area that cannot be used as a reference for the current block.

12. The device of claim 11, wherein the area that cannot be used as a reference for the current block is not within reconstructed samples of the current picture.

13. The device of claim 11, wherein the area that cannot be used as a reference for the current block is not within an available reference region for the current block.

14. The device of claim 10, wherein the one or more processors configured to determine that the MV is not a legal MV are further configured to:
determine that the MV is a zero MV.

15. The device of claim 10, wherein the one or more processors configured to determine that the MV is not a legal MV are further configured to:
determine that the current block is a first block in an independent processing area.

16. The device of claim 10, wherein the one or more processors are further configured to:
generate a motion vector (MV) candidate list for the current block, including:
generating one or more MV predictor candidates;
determining whether each of the one or more MV predictor candidates is a legal MV predictor;
including each of the one or more MV predictor candidates determined to be a legal MV predictor in the MV candidate list; and
refraining from including each of the one or more MV predictor candidates determined not to be a legal MV predictor in the MV candidate list.

17. The device of claim 16, wherein the one or more processors are further configured to:
responsive to determining that a number of candidates includes in the MV candidate list is less than a maximum size, insert one or more alternative processing methods into the MV candidate list.

18. The device of claim 17, wherein the one or more processors configured to insert one or more alternative processing methods into the MV candidate list are further configured to at least one of:
insert data representing a default value for generating one or more samples of the prediction block into the MV candidate list; or
insert data representing an intra prediction mode into the MV candidate list.

19. The device of claim 10, further comprising a display configured to display decoded video data.

20. The device of claim 10, wherein the device comprises one or more of a camera, a computer, a mobile device, a broadcast receiver device, or a set-top box.

21. A video coder comprising:
means for determining, for a current block of a current picture of video data, the current block coded using an intra block copy (IBC) mode, that a motion vector (MV) for identifying a prediction block for the current block is not a legal MV; and
means for responsive to determining that the MV is not a legal MV, reconstructing samples of the current block using an alternative processing method, including one of: means for generating the prediction block having one or more samples determined from one or more default values, means for reconstructing the samples of the current block using an intra prediction mode, determining the prediction block based at least in part on a neighboring block to the current block, or means for inheriting, from a corresponding luma block, a new motion vector for identifying the prediction block for the current block.

22. A non-transitory computer-readable storage medium having stored thereon instructions that, when executed, cause one or more processors to:
determine, for a current block of a current picture of video data, the current block coded using an intra block copy (IBC) mode, that a motion vector (MV) for identifying a prediction block for the current block is not a legal MV; and
responsive to determining that the MV is not a legal MV, reconstruct samples of the current block using an alternative processing method, including one of: generating the prediction block having one or more samples determined from one or more default values, reconstructing the samples of the current block using an intra prediction mode, determining the prediction block based at least in part on a neighboring block to the current block, or inheriting, from a corresponding luma block, a new motion vector for identifying the prediction block for the current block.

* * * * *